(12) United States Patent
Fujimori et al.

(10) Patent No.: US 11,589,605 B2
(45) Date of Patent: Feb. 28, 2023

(54) FOOD PRODUCT MOLDING DEVICE AND FOOD PRODUCT MANUFACTURING METHOD

(71) Applicant: NICHIREI FOODS INC., Tokyo (JP)

(72) Inventors: Yoshito Fujimori, Chiba (JP); Hirokazu Chukyo, Chiba (JP); Jiro Kitamura, Chiba (JP); Shunichi Watanabe, Chiba (JP); Nawo Sato, Chiba (JP)

(73) Assignee: NICHIREI FOODS INC., Tokyo (JP)

( * ) Notice: Subject to any disclaimer, the term of this patent is extended or adjusted under 35 U.S.C. 154(b) by 172 days.

(21) Appl. No.: 17/044,090

(22) PCT Filed: Mar. 22, 2019

(86) PCT No.: PCT/JP2019/011972
§ 371 (c)(1),
(2) Date: Sep. 30, 2020

(87) PCT Pub. No.: WO2019/188744
PCT Pub. Date: Oct. 3, 2019

(65) Prior Publication Data
US 2021/0030049 A1   Feb. 4, 2021

(30) Foreign Application Priority Data

Mar. 30, 2018  (JP) .............................. JP2018-070412

(51) Int. Cl.
*A23P 20/20*   (2016.01)
*A23P 30/00*   (2016.01)

(52) U.S. Cl.
CPC .............. *A23P 20/20* (2016.08); *A23P 30/00* (2016.08)

(58) Field of Classification Search
CPC ... B29C 31/006; B29C 31/047; B29C 43/203; B29C 2043/046; B29C 43/04; B29C 43/146; A23P 30/20; A23P 20/20
See application file for complete search history.

(56) References Cited

U.S. PATENT DOCUMENTS

| | | | |
|---|---|---|---|
| 6,210,146 B1* | 4/2001 | Chiba | ................... B29C 43/006 425/327 |
| 2004/0132396 A1* | 7/2004 | Gallant | ................ A22C 7/0084 452/175 |
| 2019/0274348 A1* | 9/2019 | Fujimori | ............... B29C 31/006 |

FOREIGN PATENT DOCUMENTS

| | | |
|---|---|---|
| JP | 55-37379 | 3/1980 |
| JP | 59-127489 U | 8/1984 |

(Continued)

OTHER PUBLICATIONS

International Search Report, issued in PCT/JP2019/011972, dated Jun. 11, 2019.

(Continued)

*Primary Examiner* — Alison L Hindenlang
*Assistant Examiner* — Virak Nguon
(74) *Attorney, Agent, or Firm* — Birch, Stewart, Kolasch & Birch, LLP

(57) ABSTRACT

To provide a food product molding device and a food product manufacturing method capable of molding foodstuffs into a food product having stacked plural layers with a simple structure. A mold unit in which a first mold plate and a second mold plate are stacked slidingly moves by a drive unit. Through holes respectively provided in the first mold plate and the second mold plate are linked to form molding hole portions. The molding hole portions move to a first filling position in which upper ends of the molding hole portions are connected to first filling openings, a second filling position in which upper ends of the molding hole (Continued)

portions are connected to second filling openings, and a discharge position in which upper ends of the molding hole portions are connected to pusher ports by the slide movement of the mold unit.

6 Claims, 14 Drawing Sheets

(56) References Cited

FOREIGN PATENT DOCUMENTS

| JP | 61-195670 A | | 8/1986 |
|---|---|---|---|
| JP | 61195670 A | * | 8/1986 |
| JP | 4-103495 U | | 9/1992 |
| JP | 6-50487 U | | 7/1994 |
| JP | 2006-67857 A | | 3/2006 |
| WO | WO 2018/088499 A1 | | 5/2018 |

OTHER PUBLICATIONS

Written Opinion of the International Searching Authority, issued in PCT/JP2019/011972, dated Jun. 11, 2019.

* cited by examiner

FOOD PRODUCT MOLDING DEVICE AND FOOD PRODUCT MANUFACTURING METHOD

TECHNICAL FIELD

The present invention relates to a food product molding device and a food product manufacturing method.

BACKGROUND ART

There is known a food product molding device in which prepared foodstuffs of a food product such as hamburger patty are filled in a molding hole having a predetermined mold and the foodstuffs are removed from the molding hole to thereby obtain a molded product with the foodstuffs molded into a predetermined shape. There is also known a food product molding device for obtaining a molded product having plural stacked foodstuffs (refer to Patent Literatures 1, 2).

The food product molding device described in Patent Literature 1 molds foodstuffs into a molded product having two or more stacked layers, including a rotary disk provided with plural through holes and intermittently rotating, cylindrical molding instruments provided inside the through holes to be substantial molding holes, movable members provided in the molding instruments so as to vertically move, stoppers for regulating movement of the movable members in an upper direction, a support member supporting respective stoppers, suppliers provided at respective predetermined stop positions of the through holes and filling foodstuffs into the molding instruments from a lower side, and so on. In the food product molding device, the movable member moves upward to a position where the movable member is regulated by the stopper when the foodstuff from the supplier is filled in the molding instrument at a predetermined stop position. Accordingly, the foodstuff is filled with a predetermined thickness. While regulating upward movement of the movable members as described above, different kinds of foodstuffs are filled at respective predetermined stop positions, thereby molding the foodstuffs into a molded product having two or more stacked layers. Lastly, the molded product is pushed out by the movable member to be taken out from the molding instrument.

The food product molding device described in Patent Literature 2 molds foodstuffs into a sandwich shape, including first to third molding drums on which molding holes are formed on outer circumferential surfaces, movable members disposed inside molding holes of respective molding drums, cam mechanisms arranged inside the molding drums and moving the movable members so as to change a depth of the molding hole in accordance with a rotation position of the molding drum, a molding belt laid so as to press the outer circumferential surface of the first molding drum, and so on. In the food product molding device, foodstuffs are filled in the molding holes of the first to third molding drums, the foodstuff filled in the molding hole of the second molding drum is pushed out by the movable members toward the molding hole of the first drum in which the foodstuff is filled, then, the foodstuff filled in the molding hole of the third molding drum is pushed out by the movable member. Accordingly, the foodstuffs are stacked in three layers at a position of the molding hole of the first molding drum, and the foodstuffs stacked in layers are pressed by the molding belt to perform molding.

CITATION LIST

Patent Literature

Patent Literature 1: JP-A-61-195670
Patent Literature 2: JP-UM-A-4-103495

SUMMARY OF INVENTION

Technical Problem

In the food product molding devices described in the above Patent Literatures 1, 2, there are problems that the number of components is increased and that device structures become complicated because it is necessary to provide the movable members for changing the depth of the molding holes so as to move freely, the stoppers for regulating movement of the movable members, the cam mechanisms, and so on in respective molding holes. In the food product molding device described in Patent Literature 2, plural molding drums and the molding belt for pressing the stacked foodstuffs lastly are further necessary, which further complicates the device structure and incurs increase in size of the device.

The present invention has been made in view of the above circumstances, and an object thereof is to provide a food product molding device and a food product manufacturing method capable of molding foodstuffs into a food product having stacked plural layers with a simple structure.

Solution to Problem

A food product molding device according to the present invention includes a mold unit in which first to N-th mold plates moving together are stacked in order when N is an integer of two or more, a molding hole portion formed by respective through holes respectively formed in the first to N-th mold plates being linked in a stacking direction of the first to N-th mold plates, sequentially moving from first to N-th supply positions corresponding to first to N-th supply openings for supplying foodstuffs by the movement of the mold unit in one direction, and moving to a discharge position, first to N-th restraining members provided so as to correspond to the first to N-th mold plates, and a pusher pushing out the foodstuffs inside the molding hole portion at the discharge position, in which, when J is an integer from 1 to N, a J-th restraining member covers a downstream end in a supply direction of the through hole in a J-th mold plate so as to restrain movement of the foodstuff from the through hole in the J-th mold plate to a downstream side in the supply direction when the molding hole portion is at a J-th supply position, and does not cover the downstream end in the supply direction of the through hole in the J-th mold plate when the molding hole portion is at a (J+1)-th supply position to the discharge position.

A food product manufacturing method according to the present invention includes a moving step of moving a molding hole portion formed by a plurality of through holes being linked to a discharge position through a plurality of supply positions where foodstuffs are supplied from one end to the inside of the molding hole portion, a first feeding step of, while a downstream end in a supply direction of anyone of through holes other than the through hole positioned on the most downstream side in the supply direction of foodstuffs is covered so as to restrain movement of a foodstuff from the one through hole downward in the supply direction, filling the foodstuff from the one end of the molding hole portion to the downstream end of the one through hole at an upstream-side supply position of the plural supply positions, a second feeding step of, while a downstream end in the supply direction of another through hole on a downstream side in the supply direction of the one through hole is covered so as to restrain movement of the foodstuff from the another through hole downward in the supply direction, filling the foodstuff from the one end of the molding hole portion to the downstream end of the another through hole at a downstream-side supply position on a downstream side of the upstream-side supply position of the plural supply positions in a movement direction of the molding hole portions, and a taking-out step of pushing out the foodstuffs from the molding hole portion at the discharge position in a state where ends of respective through holes are opened to be taken out as a food product.

Advantageous Effects of Invention

When adopting the food product molding device according to the present invention, the molding hole portion formed by respective through holes respectively formed in respective mold plates being linked is sequentially moved to a plurality of supply positions where the molding hole portion is connected to respective supply openings and moved to the discharge position by moving the mold unit in which plural mold plates moving together are stacked, and the downstream end in the supply direction of the through hole corresponding to the supply position is covered with the restraining member to thereby restrain movement of the foodstuff from the through hole to the downstream side in the supply direction; therefore, foodstuffs can be molded into a food product in which foodstuffs are stacked in plural layers with a simple structure.

When adopting the food product manufacturing method according to the present invention, the molding hole portion formed by plural through holes being linked is moved to plural supply positions, and, at each supply position where the foodstuff is filled from one end of the molding hole portion, an end of the through hole on the other end side of the molding hole portion corresponding to the supply position is covered so as to restrain movement of the foodstuff from the end to the downstream side in the supply direction; therefore, foodstuffs can be molded into a food product in which foodstuffs are stacked in plural layers with a simple structure.

DESCRIPTION OF EMBODIMENTS

First Embodiment

Figure 1:
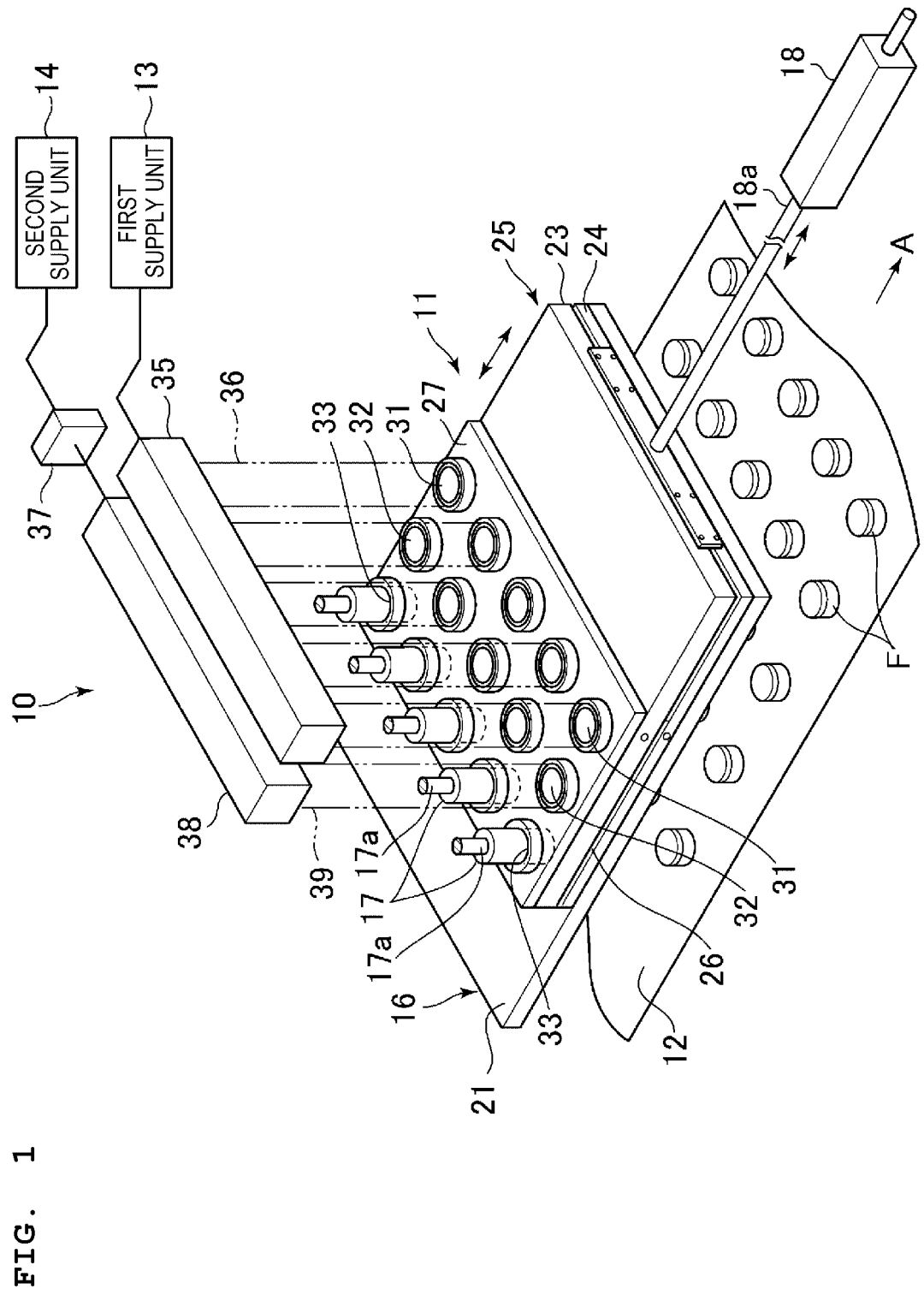
FIG. 1 is a perspective view showing a food product molding apparatus according to a first embodiment.

In FIG. 1, a food product molding apparatus 10 includes a food product molding device (hereinafter referred to as merely a "molding device") 11, a conveying belt 12, and first and second supply units 13, 14. The molding device 11 is disposed above the conveying belt 12. The conveying belt 12 conveys molded products (food products) F discharged from the molding device 11. The conveying belt 12 continuously moves, for example, at a predetermined speed to convey the molded products F in a conveying direction shown by an arrow A. The speed of the conveying belt 12 is determined so that the molded products F discharged from the molding device 11 do not overlap one another on the conveying belt 12. The molding device 11 manufactures the molded products (food products) F molded with a plurality of foodstuffs F1, F2 (see FIG. 4) being stacked. In this example, a filling opening, a filling position, and a filling direction correspond to a supply opening, a supply position, and a supply direction.

The molding device 11 includes a main body part 16, pushers 17, a drive unit 18, and so on. The main body part 16 includes a base plate 21, a mold unit 25 having a first mold plate 23 and a second mold plate 24, a blocking plate 26 as a restraining member, and a cover plate 27. The molding device 11 is a sliding type device in which the mold unit 25 is linearly and slidingly moved. In this example, the foodstuffs F1, F2 are supplied to the molding device 11 from above as described later. Therefore, the filling direction is from above to below. In FIG. 1, a thickness of the blocking plate 26 is drawn in an exaggerated manner, and the same applies to other drawings.

The base plate 21 is fixed above the conveying belt 12 by a not-shown support member. The second mold plate 24, the blocking plate 26, and the first mold plate 23 are stacked on an upper surface of the base plate 21 in order from the base plate 21 side. The second mold plate 24 is provided on the base plate 21 so as to slide freely along the conveying direction. The first mold plate 23 is fixed to the second mold plate 24. The mold unit 25 formed by stacking the first mold plate 23 and the second mold plate 24 can slide freely in this manner.

The drive unit 18 allows the mold unit 25 to slidingly move. The drive unit 18 is formed by, for example, an air cylinder, a linear motor, and so on, in which the first mold plate 23 and the second mold plate 24 are fixed to one end of a shaft 18a. The mold unit 25 is moved, by the drive unit 18, to a first mold position, a second mold position, and a discharge mold position corresponding to a later-described first filling position, a second filling position, and a discharge position in this order. After the mold unit 25 is moved to the discharge mold position, the mold unit 25 is slidingly moved in an opposite direction to be returned to the first mold position.

The blocking plate 26 is provided as a first blocking plate corresponding to the first mold plate 23, which is arranged on a bottom surface (surface on a downstream side in the filling direction) of the first mold plate 23. Therefore, the blocking plate 26 is disposed between the first mold plate 23 and the second mold plate 24. The blocking plate 26 is fixed to, for example, the base plate 21 or the like so as not to move together with the first mold plate 23 and the second mold plate 24. Moreover, the base plate 21 functions as a second blocking plate corresponding to the second mold plate 24 in this example. The details of the base plate 21 will be described later.

The cover plate 27 is fixed to, for example, the base plate 21 or the like in the same manner as the blocking plate 26. Therefore, positions of the blocking plate 26 and the cover plate 27 do not change with respect to the base plate 21. A plurality of (five in this case) first filling openings 31, a plurality of second filling openings 32, and a plurality of pusher ports 33 are respectively provided in the cover plate 27. The first filling openings 31 are provided at an end part of the cover plate 27 on a downstream side in the conveying direction side by side in a width direction orthogonal to the conveying direction. The pusher ports 33 are provided at an end part of the cover plate 27 on an upstream side in the conveying direction side by side in the width direction. The second filling openings 32 are provided side by side in the width direction between the first filling openings 31 and the pusher ports 33. The same number (five in this example) of first filling openings 31, the second filling openings 32, and the pusher ports 33 are provided at the same pitch in the width direction. The first filling opening 31, the second filling opening 32, and the pusher ports 33 are aligned in the conveying direction, namely, on a straight line in a slide direction of the mold unit 25.

The first filling openings 31, the second filling openings 32, and the pusher ports 33 are integrally provided in the cover plate 27 in this example; however, these may be separately provided. It is also possible to adopt a structure in which the cover plate 27 is omitted and, for example, one ends of pipes 36, 39 are held on an upper surface of the first mold plate 23 in a close contact state as the first filling openings 31 and the second filling openings 32.

The first supply unit 13 supplies the foodstuff F1 to respective first filling openings 31 through a distributor 35 and the pipes 36. The first supply unit 13 applies a predetermined pressure to the foodstuff F1 so as to push out the foodstuff F1 toward the respective first filling openings 31. The second supply unit 14 supplies the foodstuff F2 to the respective second filling openings 32 through a valve 37 as a supply stop part, a distributor 38, and the pipes 39. The second supply unit 14 applies a predetermined pressure to the foodstuff F2 so as to push out the foodstuff F2 toward the second filling openings 32.

The valve 37 as the supply stop part is closed when the mold unit 25 returns to the first mold position from the discharge mold position for preventing unnecessary filling of the foodstuff F2. Accordingly, the supply of the foodstuff F2 from the second filling openings is stopped with respect to molding hole portions 43 returning to the first filling position from the discharge position. The supply stop part is not limited to the valve 37 but, for example, a shutter mechanism for opening/closing respective second filling openings 32. It is also possible to control a motor that applies a pressure to the foodstuff F2 to stop when the mold unit 25 returns to the first mold position from the discharge mold position by a controller.

The pushers 17 are provided for the respective pusher ports 33. The respective pushers 17 vertically move by an actuator or the like (not shown), moving between a push-out position at which the molded products F are pushed out from the main body part 16 and a retracted position at which the pushers are retracted upward from the push-out position so as not to inhibit slide movement of the mold unit 25. The molded products F molded inside the main body part 16 are pushed out downward by the movement of the pushers 17 to the push-out position and discharged on the conveying belt 12 as the molded products F. In this example, five molded products F are discharged at the same time by the five pushers 17 moving downward at the same time.

Each pusher 17 in this example has a cylindrical shape with a closed top. The shape of a lower end of the pusher 17 can be selected according to the kind of the foodstuffs F1, F2. The shape of the lower end of the pusher 17 may be, for example, a linear shape, a serrated shape and so on. The lower end of the pusher 17 may also have a shape with an angle with respect to a horizontal surface. The shapes of the pusher 17 are not limited to the above. For example, the pusher 17 is made to be a columnar shape so that a lower surface pushes the molded products F. It is further possible to push out the molded products F with an air pressure.

Figure 2:
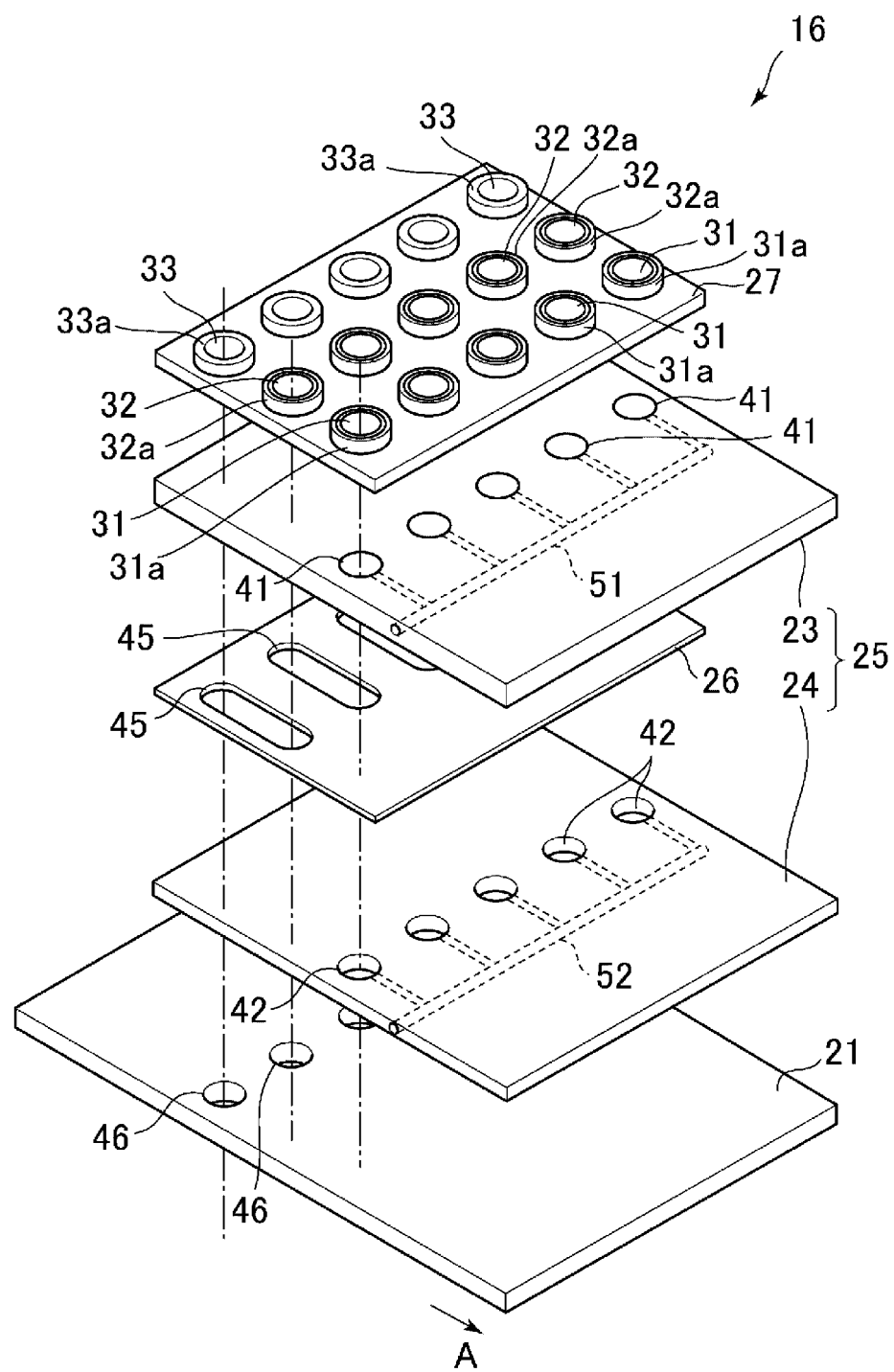
FIG. 2 is an exploded perspective view showing a structure of a main body part of a food product molding device.

In FIG. 2, the base plate 21, the first mold plate 23, the second mold plate 24, the blocking plate 26, and the cover plate 27 forming the main body part 16 all have a rectangular plate shape. The base plate 21 is formed to be longer in the slide direction of the mold unit 25 than the first mold plate 23 and the second mold plate 24. A material for the base plate 21, the first mold plate 23, the second mold plate 24, the blocking plate 26, and the cover plate 27 may be metal or resin. For example, the base plate 21, the blocking plate 26, and the cover plate 27 are made of metal, and the first mold plate 23 and the second mold plate 24 are made of resin.

The first filling openings 31, the second filling openings 32, and the pusher ports 33 provided in the cover plate 27 are formed as hollow internal spaces of sleeves 31a, 32a, and 33a all having a cylindrical shape so as to pierce the cover plate 27 in a thickness direction (a vertical direction in the drawing). The cover plate 27 also functions as a member suppressing leakage of the foodstuffs F1, F2 to the top of the main body part 16.

A plurality of through holes 41 are provided side by side in the width direction of the first mold plate 23. A plurality of through holes 42 are provided side by side in the width direction of the second mold plate 24. Pitches of the through holes 41, 42 in the width direction are both the same as the pitch of the first filling openings 31 in the width direction. The first mold plate 23 and the second mold plate 24 are stacked in a state of sandwiching the blocking plate 26 so that axial centers of the through holes 41 and the through holes 42 correspond to each other, which are fixed to each other. Accordingly, a plurality of molding hole portions 43 (see FIG. 4) in which the through holes 41 and the through holes 42 are linked are formed. Strictly, each molding hole portion 43 has a clearance between the through hole 41 and the through hole 42 for a thickness of the blocking plate 26.

The molding hole portions 43 move to the first filling position in which one ends thereof, upper ends in this example, are connected to the first filling openings 31, the second filling position in which upper ends thereof are connected to the second filling openings 32, and the discharge position in which upper ends thereof are connected to the pusher ports 33 by slide movement of the mold unit 25.

An air vent hole 51 formed inside the first mold plate 23 is connected to the respective through holes 41 in the first mold plate 23. An air vent hole 52 formed inside the second mold plate 24 is connected to the respective through holes 42 in the second mold plate 24. In the air vent holes 51, 52, one ends open to side surfaces of the first mold plate 23 and the second mold plate 24 respectively. The air vent holes 51, 52 are connected to an aspirator (not shown) through these openings. Accordingly, air inside the through holes 41, 42 is vented at the timing when the foodstuffs F1, F2 are filled into the through holes 41, 42 to thereby facilitate filling of the foodstuffs F1, F2 into the through holes 41, 42 and to prevent formation of an area where the foodstuffs F1, F2 are not filled in the through holes 41, 42. Positions of respective openings of the air vent holes 51, 52 inside the through holes 41, 42 are preferably as close as possible to lower ends of the through holes 41, 42.

Although air is vented from the through holes 41, 42 by a pressure reducer in this example, it is also possible to adopt a structure in which one ends of the air vent holes 51, 52 are opened at the time of filling the foodstuffs F1, F2. In this case, air inside the through holes 41, 42 is vented to the outside through the air vent holes 51, 52 when the foodstuffs F1, F2 are filled into the through holes 41, 42.

The first mold plate 23 and the second mold plate 24 are replaceable, and mold plates in which the through holes 41, 42 corresponding to the shape of the molded products F are formed can be used. It is also possible to use the first mold plates 23 and the second mold plates 24 having different thicknesses, whereby a thickness of the molded products F and thicknesses of the foodstuffs F1, F2 forming the molded products F can be desired thicknesses.

The blocking plate 26 has a thin plate shape. The blocking plate 26 has also the same size as the cover plate 27, which extends to a portion just below the first filling openings 31. The blocking plate 26 covers and blocks downstream ends of the through holes 41 of the first mold plate 23 in a filling direction of the foodstuff F1, namely, lower ends of the through holes 41 in this example when the molding hole portions 43 are at the first filling position. That is, the blocking plate 26 blocks the lower ends of the through holes 41 between the through holes 41 and the through holes 42 when the mold unit 25 is at the first mold position. Accordingly, it is possible to inhibit the foodstuff F1 from being filled in the through holes 42 of the second mold plate 24 at the first filling position.

The blocking plate 26 may block lower ends of the through holes 41 of the first mold plate 23 when the molding hole portions 43 are at the first filling position, preferably, the blocking plate 26 blocks lower ends of the through holes 41 of the first mold plate 23 in a range from the first filling position to the front of the second filling position as in this example. That is, it is sufficient to block just the lower ends of the through holes 41 of the first mold plate 23 in a case where the filled foodstuff F1 remains inside the through holes 41 while the molding hole portions 43 move from the first filling position to the second filling position; however, it is preferable to block the lower ends of the through holes 41 of the first mold plate 23 in the range from the first filling position to the front of the second filling position as in this example for preventing occurrence of a defect in staking of the foodstuff F1 and the foodstuff F2, for example, when the foodstuff F1 inside the through hole 41 moves into the through hole 42 due to high flowability of the foodstuff F1.

Moreover, the blocking plate 26 in this example extends to a portion just below the pusher ports 33; therefore, openings 45 are formed in a movement range of the molding hole portions 43 from a portion just below the second filling openings 32 to the portion just below the pusher ports 33. According to the structure, the molding hole portions 43 are moved from the second filling position to the discharge position without splitting the foodstuffs F1, F2 filled in the molding hole portions 43 by the movement of the molding hole portions 43.

Since the blocking plate 26 has a shape in which the openings 45 are formed in the movement range of the molding hole portions 43 from the second filling position to the discharge position, the blocking plate 26 blocks a clearance (hereinafter referred to as a mold plate clearance) between the first mold plate 23 and the second mold plate 24 around the openings 45. It is possible to prevent the foodstuffs F1, F2 from leaking out to the outside of the mold unit 25 through the mold plate clearance by the blocking plate 26. Moreover, the foodstuffs F1, F2 entering the mold plate clearance in the second filling position can be pushed back into the molding hole portions 43 when the mold unit 25 moves to the discharge slide position by portions (edges of openings 45) of the blocking plate 26 blocking the mold plate clearance at a position beyond the discharge position in a moving direction from the second filling position to the discharge position.

In the base plate 21, discharge holes 46 are formed at portions just below the respective pusher ports 33. The lower ends of the molding hole portions 43 are connected to the discharge holes 46 at the discharge position. The discharge holes 46 are holes for discharging the molded products F molded in the molding hole portions 43, which pierce the base plate 21 in the thickness direction. When the pushers 17 enter the molding hole portions 43, the molded products F inside the molding hole portions 43 are pushed downward and discharged to the outside of the main body part 16 through the discharge holes 46. The discharge holes 46 may have a size and a shape enabling discharge of the molded products F, which may be, for example, larger than a diameter of the molding hole portions 43. The discharge holes 46 may have a tapered shape in which an inner diameter thereof is increased toward a lower part. It is also preferable to use the base plate 21 not extending to the discharge position and to discharge the molded products F from the molding hole portions 43 onto the conveying belt 12 directly.

The pushers 17 are configured to be attached/detached freely to/from shafts 17a (see FIG. 1) so as to be replaced corresponding to the kind of the foodstuffs F1, F2, the shape and size of the molding hole portions 43 (through holes 41, 42). It is also preferable that the shape and size of the pushers 17 in horizontal cross section with respect to the shape and size of the molding hole portions 43 in horizontal cross section are determined according to the kind and the degree of binding of the foodstuffs F1, F2.

For example, in a case where any of the foodstuff F1 and the foodstuff F2 is a foodstuff with a low degree of binding, it is preferable that shapes and sizes of the pushers 17 and the molding hole portions 43 in horizontal cross section are allowed to almost correspond to each other so as not to generate a clearance between an outer circumferential surface of the pusher 17 and an inner circumferential surface of the molding hole portion 43. Accordingly, the foodstuffs F1, F2 from the molding hole portions 43 do not enter between the outer circumferential surface of the pusher 17 and the inner circumferential surface of sleeves 33a, which prevents deformation of the molded products F at the time of pushing out as well as suppressing leakage of the foodstuffs F1, F2 to the outside of the main body part 16 through the pusher ports 33. On the other hand, in a case where the foodstuffs F1, F2 are a foodstuff with a high degree of binding, it does not matter that shapes and sizes of the pushers 17 and the molding hole portions 43 in horizontal cross section do not correspond to each other and that a clearance is formed between the outer circumferential surface of the pusher 17 and the inner circumferential surface of the molding hole portion 43. This is because the molded products F are not deformed at the time of being pushed out and the foodstuffs F1, F2 do not enter the clearance even when the clearance is formed between the outer circumferential surface of the pusher 17 and the inner circumferential surface of the molding hole portion 43 as the degree of binding of is high.

The base plate 21 also functions as the second blocking plate (second restraining member) corresponding to the second mold plate 24 as described above. The base plate 21 is arranged on a bottom surface (a surface on a downstream side in the filling direction) of the second mold plate 24, blocking lower ends (downstream ends in the filling direction) of the through holes 42 of the second mold plate 24 in a range from the first filling position to the front of the discharge position including the timing when the molding hole portions 43 are at the second filling position.

The lower ends of the molding hole portions 43 at the first filling position are blocked by the base plate 21 in this example. As middle parts of the molding hole portions 43 are blocked by the blocking plate 26 at the first filling position, it is not necessary to block the lower ends of the molding hole portions 43 by the base plate 21 at the first filling position. Also in this example, the upper surface of the base plate 21 is used as a surface on which the mold unit 25 slides, the length thereof is set to be longer than the first mold plate 23 and the second mold plate 24 in the slide direction as described above. From the viewpoint of the second blocking plate, it is sufficient that the base plate 21 blocks the lower ends of the through holes 42 of the second mold plate 24 at the second filling position similarly to the blocking plate 26 as the first blocking plate, and it is preferable that the base plate 21 blocks the lower ends of the through holes 42 of the second mold plate 24 in a range from the second filling position to the front of the discharge position.

Figure 3:
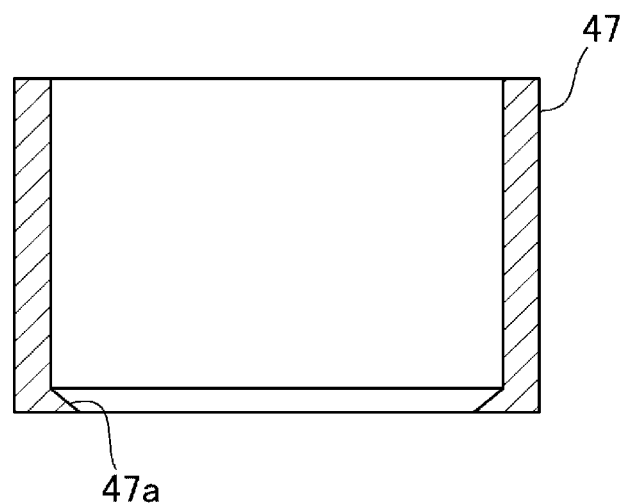
FIG. 3 is a cross-sectional view showing a cutting blade integrally formed with an inner tube.

Inner tubes 47 (see FIG. 4) are arranged in the first filling openings 31. The foodstuff F1 supplied to the first filling openings 31 is filled in the molding hole portions 43 through the inner tubes 47. As shown in FIG. 3, each inner tube 47 has, for example, a cylindrical shape, and a cutting blade 47a is integrally formed at an inner periphery of a lower end. The inner tubes 47 are assembled so that the cutting blades 47a closely contact with the upper surface of the first mold plate 23. Accordingly, the foodstuff F1 or the contents thereof can be cut off by the cutting blades 47a even when it is difficult to cut off the foodstuff F1 or the contents thereof only by shearing with the first mold plate 23 and the cover plate 27. Similarly, inner tubes 48 (see FIG. 4) provided with cutting blades at lower ends are arranged in the second filling openings 32, and the foodstuff F2 is filled in the molding hole portions 43 through the inner tubes 48. As the cutting blade of each inner tube 48 is the same as that of the inner tube 47, the detailed explanation is omitted and is not shown in the drawing.

It is also preferable to adopt a structure in which the inner tubes 47, 48 are omitted and the cutting blades are arranged at respective lower ends of the first filling openings 31 and the second filling openings 32. It is not necessary to provide the cutting blades in a case where a foodstuff with no problem in cutting is filled as described above. The shape of the cutting blades can be appropriately determined according to the kind of the foodstuffs F1, F2, the shape of the molding hole portions 43 in horizontal cross section, and so on. The shapes of the first filling openings 31, the second filling openings 32, and the inner tubes 47, 48 in horizontal cross section, and the shape of openings surrounded by the cutting blades are not limited to a circular shape but may be polygonal shapes such as an approximately square and a pentagon.

The molding device 11 has a simple structure in which the molding hole portions 43 are moved to the first filling position, the second filling position, and the discharge position by moving the mold unit 25 formed by stacking the first mold plate 23 and the second mold plate 24, and the lower ends of the through holes 41, 42 are blocked by the blocking plate 26 and the base plate 21 as the blocking plate according to the filling position as described above.

The structure of the molding device 11 does not limit the relationship between the push-out direction of the molded products F by the pushers 17 and the filling direction of the foodstuffs F1, F2. A posture of the molding device 11, the filling direction of respective foodstuffs F1, F2 with respect to the molding device 11, and the push-out direction of the molded products F may be set independently and optionally. The layout in which the pipes 36, 39 for supplying the foodstuffs F1, F2, the pushers 17, and the actuators for driving them are arranged on an upper surface side of the molding device 11 can reduce a distance between the main body part 16 and the conveying belt 12 to thereby reduce a falling distance of the molded products F, which is advantageous for preventing deformation of the molded products F due to impact of falling, as in this example.

Figure 4:
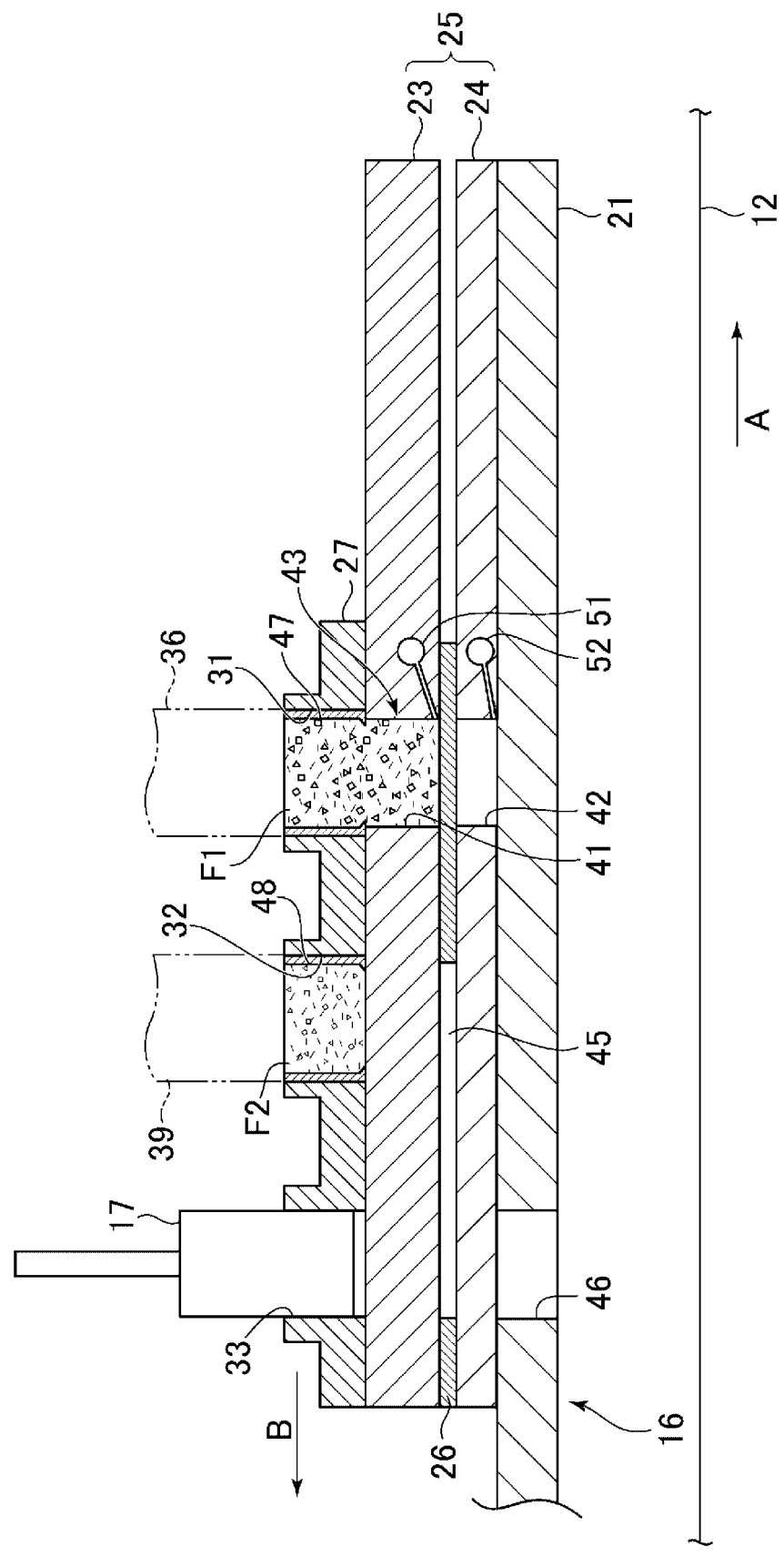
FIG. 4 is a cross-sectional view showing a filling state of a foodstuff in a molding hole portion at a first filling position.

Next, the operation of the above structure will be explained. First, the mold unit 25 is moved to the first mold position. That is, the respective molding hole portions 43 are moved to the first filling position where the upper ends thereof (upper ends of the through holes 41) are connected to the first filling openings 31 to be set as shown in FIG. 4. The first supply unit 13 continuously applies a predetermined pressure to the foodstuff F1 inside the pipes 36 so as to supply the foodstuff F1 to the first filling openings 31. Accordingly, when the molding hole portions 43 are connected to the first filling openings 31 as described above, the foodstuff F1 is filled into corresponding molding hole portions 43 from respective first filling openings 31. As the lower ends of respective through holes 41 are blocked by the blocking plate 26 at the first filling position, the foodstuff F1 from the first filling openings 31 is filled only into the through holes 41 (a first feeding process). Air inside the respective through holes 41 is vented through the air vent hole 51; therefore, the foodstuff F1 is filled so as to fill up the through holes 41.

When the molding hole portions 43 are at the first filling position, the lower ends of the second filling openings 32 are blocked by the first mold plate 23. Therefore, the foodstuff F2 does not leak out from the second filling openings 32.

Figure 5:
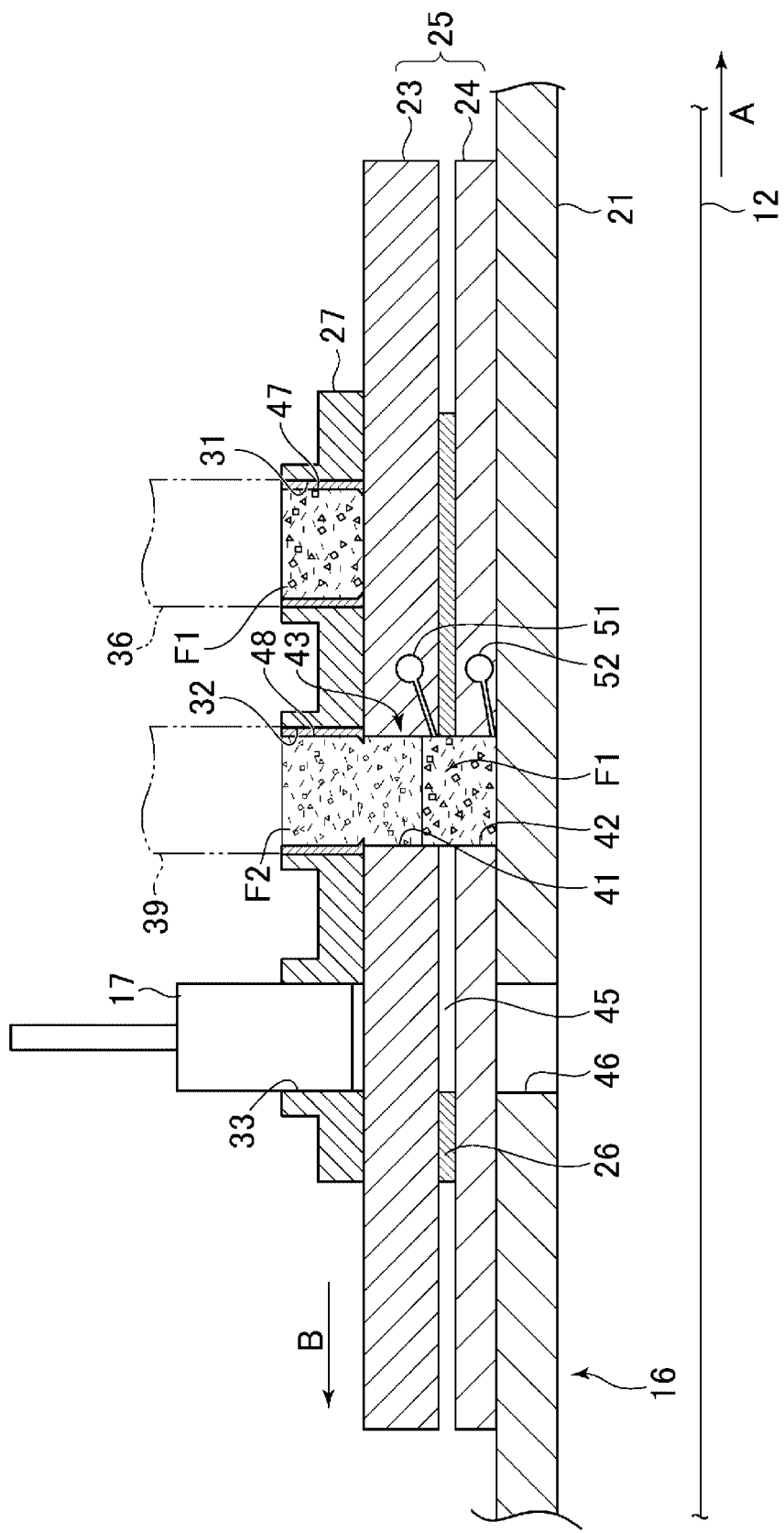
FIG. 5 is a cross-sectional view showing a filling state of foodstuffs in the molding hole portion at a second filling position.

After the foodstuff F1 is filled, the mold unit 25 slidingly moves downstream in the conveying direction from the first mold position to be set at the second mold position. Due to the movement of the mold unit 25, the molding hole portions 43 are moved from the first filling position to be set at the second filling position where upper ends thereof are connected to the second filling openings 32 as shown in FIG. 5.

At the time of movement of the molding hole portions 43, the foodstuff F1 inside the through holes 41 is separated from the foodstuff F1 inside the first filling openings 31 (inner tubes 47) and moves to the second filling position with the molding hole portions 43. Even when the molding hole portions 43 move from below the first filling openings 31, the foodstuff F1 does not leak out from the first filling openings 31 as the lower ends of the first filling openings 31 are blocked by the first mold plate 23.

The molding hole portions 43 are positioned at the openings 45 of the blocking plate 26 when the molding hole portions 43 are set at the second filling position as described above; therefore, the through holes 41 and the through holes 42 are connected to each other. In the second filling position, lower ends of the molding hole portions 43 are blocked by the base plate 21.

The second supply unit 14 continuously applies a predetermined pressure to the foodstuff F2 inside the pipes 39 so as to supply the foodstuff F2 to the second filling openings 32. The valve 37 is in an opened state. Accordingly, when the molding hole portions 43 are connected to the second filling openings 32 as described above, the foodstuff F2 is filled into corresponding molding hole portions 43 from respective second filling openings 32 (a second feeding process). At this time, the foodstuff F1 previously filled inside the through holes 41 moves toward the through holes 42 through the openings 45 by being pushed by the foodstuff F2 to be filled. As air inside respective through holes 42 is vented through the air vent hole 52 at this time, movement of the foodstuff F1 to the through holes 42 and filling of the foodstuff F2 are easily performed, and an unfilled area is not formed inside the through holes 42.

In this example, a thickness of the first mold plate 23 is larger than a thickness of the second mold plate 24. Accordingly, an amount of the foodstuff F1 filled in the through hole 41 is larger than a capacity of the through hole 42. Therefore, part of the foodstuff F1 inside the through hole 41 is filled in the through hole 42, and a residual foodstuff F1 remains in a lower part of the through hole 41. As a result, the foodstuff F2 is filled above the remaining foodstuff F1 inside the through hole 41. As the opening 45 is disposed between the through hole 41 and the through hole 42, the foodstuff F1 in the through hole 41 and the foodstuff F1 in the through hole 42 are integrated.

Figure 6:
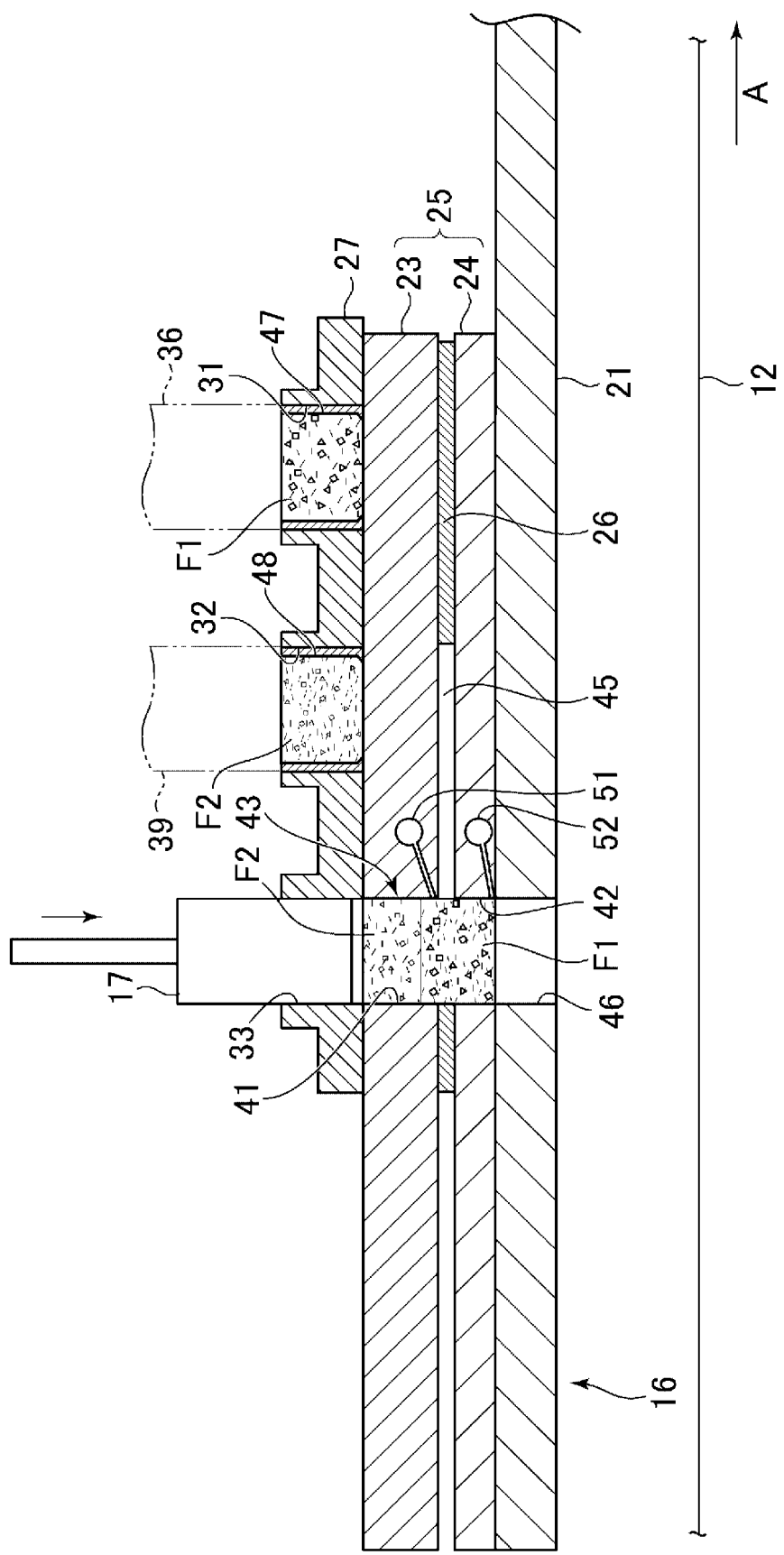
FIG. 6 is a cross-sectional view showing a filling state of foodstuffs in the molding hole portion at a discharge position.

After the foodstuff F2 is filled, the mold unit 25 slidingly moves downward in the conveying direction from the second mold position to be set at the discharge mold position. Due to the movement of the mold unit 25, the molding hole portions 43 are moved from the second filling position to be set at the discharge position where upper ends thereof are connected to the pusher ports 33 as shown in FIG. 6. In the discharge position, lower ends of the molding hole portions 43 are connected to the discharge holes 46 in the base plate 21.

The foodstuff F2 in the through hole 41 is separated from the foodstuff F2 inside the second filling opening 32 (the inner tube 48) with the movement of the molding hole portions 43 from the second filling position to the discharge position, moving with the foodstuff F1 inside the through hole 42 and the through hole 41. The foodstuff in the foodstuff F1 and the foodstuff F2 existing at a boundary portion between the through hole 41 and the through hole 42 passes inside the opening 45 of the blocking plate 26; therefore, the foodstuffs F1, F2 filled in the molding hole portion 43 are not separated.

Even when the molding hole portions 43 move to the discharge position, the lower ends of the first filling openings 31 and the second filling openings 32 are blocked by the first mold plate 23; therefore, the foodstuffs F1, F2 do not leak out from the first filling openings 31 and the second filling openings 32.

Figure 7:
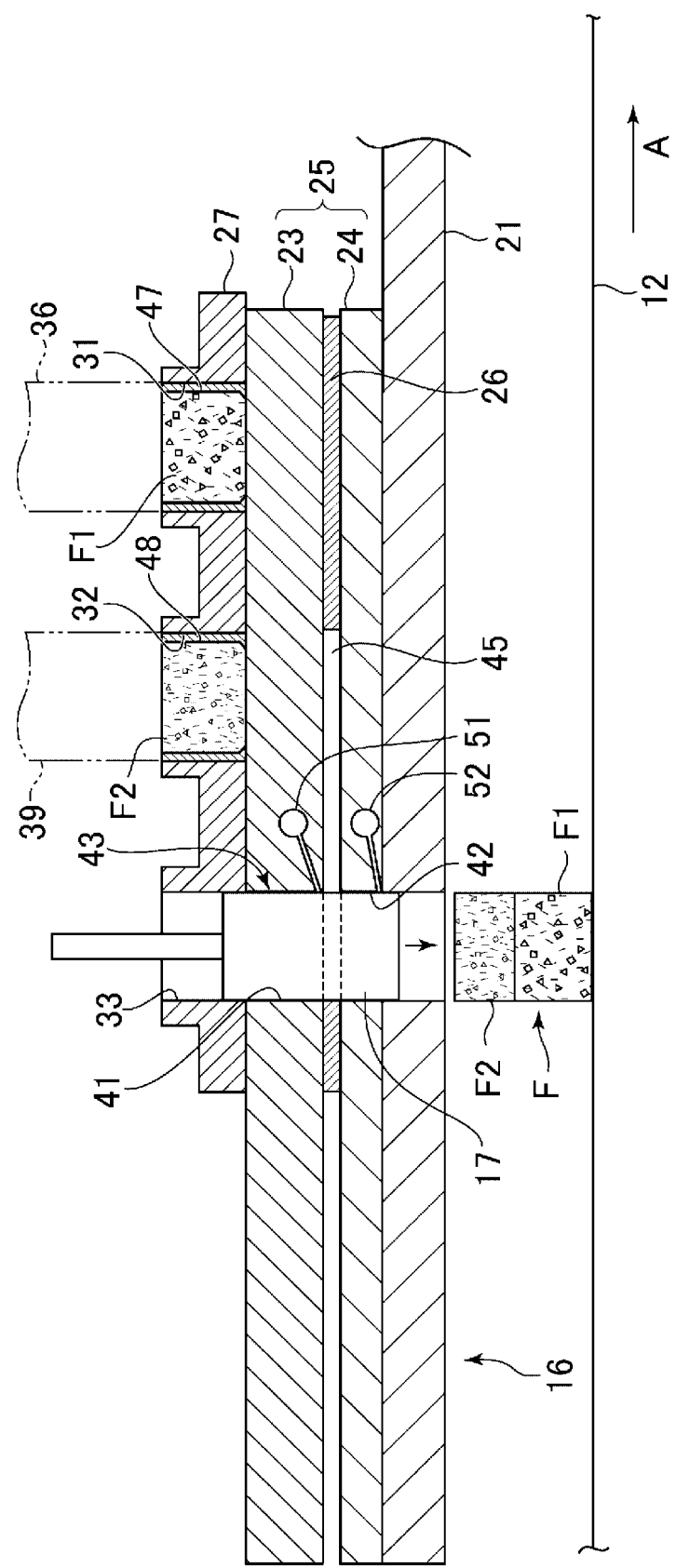
FIG. 7 is a cross-sectional view showing a state in which a molded product is pushed out from the molding hole portion by a pusher.

When the molding hole portions 43 are set at the discharge position as described above, the pushers 17 positioned at the retracted position descend to the push-out position as shown in FIG. 7. Accordingly, five molded products F formed by the foodstuffs F1, F2 stacked in respective molding hole portions 43 are respectively pushed from the molding hole portions 43 toward the discharge holes 46 and discharged through the discharge holes 46. The discharged five molded products F are placed on the conveying belt 12 and conveyed in the conveying direction.

After the molded products F are discharged, the pushers 17 are returned to the retracted position, and the valve 37 is closed. After that, a returning operation of allowing the mold unit 25 to be slid in the conveying direction (direction of the arrow A) and returning the mold unit 25 from the discharge mold position to the first mold position is performed. The molding hole portions 43 passes the position where the upper ends thereof are connected to the second filling openings 32 at the time of the returning operation; however, the foodstuff F2 does not flow into the molding hole portions 43 as the valve 37 is closed and the pressure is not applied to the foodstuff F2. When the mold unit 25 is set at the first mold position by the returning operation, the valve 37 is opened.

After that, the filling of the foodstuff F1 at the first filling position, the movement to the second filling position, the filling of the foodstuff F2 at the second filling position, the movement to the discharge position, the discharge of the molded products F, and the returning operation are performed by the same procedure.

The molded products F in which the foodstuffs F1, F2 are stacked are manufactured by the molding device 11 with the simple structure as described above. As the structure of the molding device 11 is simple, the maintenance such as adjustment and cleaning is also easy. Moreover, the molding hole portions 43 are kept in the sealed state until reaching the discharge position. Accordingly, the foodstuffs F1, F2 having high flowability can be used, and the device is hygienic as scattering of the foodstuffs F1, F2 does not occur.

Figure 8:
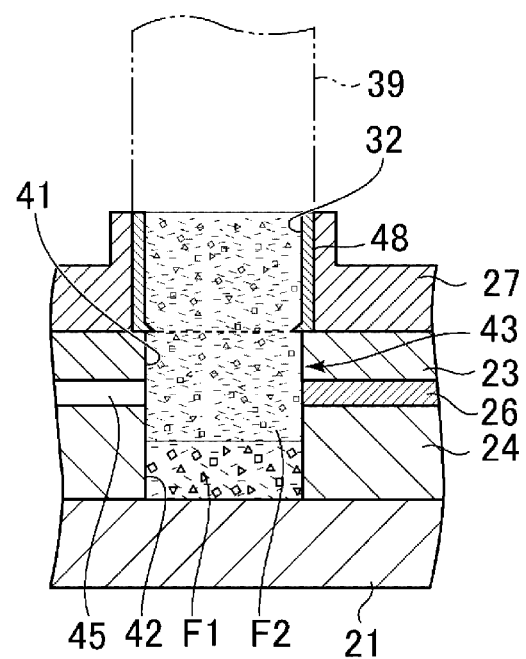
FIG. 8 is a cross-sectional view showing a filling state of foodstuffs at the second filling position in an example in which thicknesses of first and second mold plates are changed.

Incidentally, a thickness of the molded product F and thicknesses of the foodstuffs F1, F2 forming the molded product F can be respectively changed by replacing the first mold plate 23 and the second mold plate 24 with plates with different thicknesses as described above. For example, in a case where the foodstuff F1 is formed to be thin and the foodstuff F2 is formed to be thick, the first mold plate 23 is made to be thin and the second mold plate 24 is made to be thick contrary to the above example as shown in FIG. 8 as a state at the second position. The thickness of the foodstuff F1 filled at the first filling position is determined by the thickness of the first mold plate 23 (a depth of the through hole 41), and the thickness of the foodstuff F2 filled at the second filling position will be a thickness obtained by subtracting the thickness of the first mold plate 23 from a total of thicknesses of the first mold plate 23 and the second mold plate 24 (total of depths of the through holes 41, 42).

Although the mold unit is formed of two pieces of the first mold plate and the second mold plate in the above example, the number of mold plates in the mold unit is not limited to this, which can be three of more according to the number of stacked layers of foodstuffs. The blocking plates are provided so as to correspond to respective mold plates.

Figure 9:
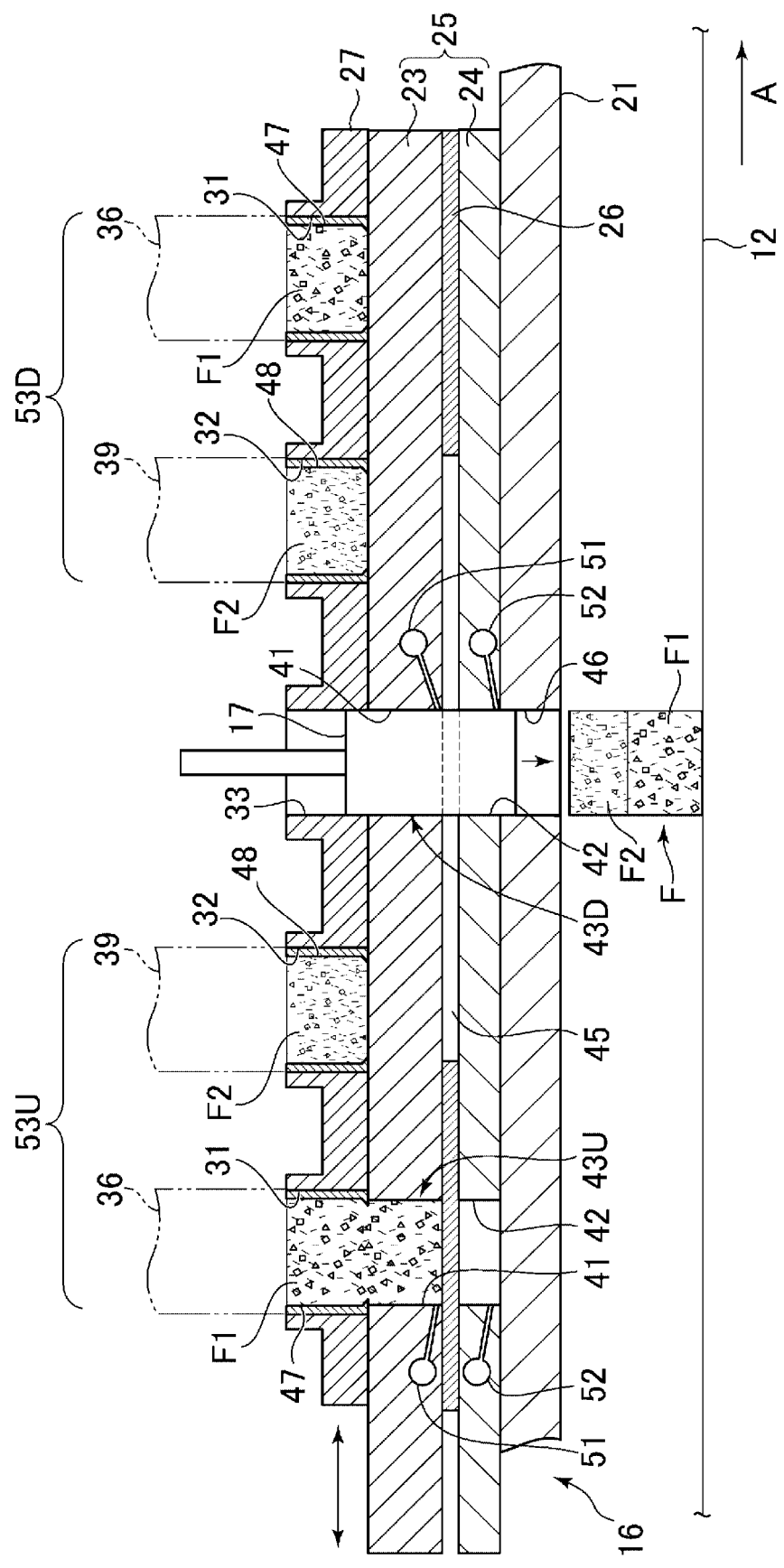
FIG. 9 is a cross-sectional view showing an example in which molded products are taken out respectively in a forward motion and a backward motion of a mold unit.

FIG. 9 shows an example in which the molded products F are taken respectively in a forward motion and a backward motion of the reciprocating mold unit 25. In the mold unit 25 in this example, molding hole portions 43D and molding hole portions 43U are formed side by side at a predetermined interval in the slide direction of the mold unit 25. That is, the through holes 41, 42 forming the molding hole portion 43D and the through holes 41, 42 forming the molding hole portion 43U are respectively formed in the first mold plate 23 and the second mold plate 24. In the cover plate 27, a downstream-side filling part 53D corresponding to the molding hole portions 43D is formed downstream of the pusher ports 33 in the conveying direction, and an upstream-side filling part 53U corresponding to the molding hole portions 43U is formed upstream in the conveying direction, respectively. Both the downstream-side filling part 53D and the upstream-side filling part 53U have the first filling openings 31 and the second filling openings 32. The second filling openings 32 and the first filling openings 31 are respectively disposed in this order from the pusher port 33 side. The pushers 17, the pusher ports 33, and the discharge holes 46 are used in common by the molding hole portions 43D, 43U.

In the cover plate 27 configured as the above, the first filling openings 31, the second filling openings 32, the pusher ports 33, the second filling openings 32, and the first filling openings 31 are arranged at a fixed pitch along the slide direction of the mold unit 25, in which the first filling openings 31 and the second filling openings 32 are symmetrically arranged with respect to the pusher ports 33. A distance between centers (pitch) of the molding hole portions 43D and 43U in the slide direction of the mold unit 15 is set to twice the pitches of the first filling hole 31, the second filling hole 32, and the pusher port 33 in the cover plate 27. Accordingly, for example, when the molding hole portions 43D sequentially move to the first filling position where the molding hole portions 43D are connected to the first filling openings 31 in the downstream-side filling part 53D, the second filling position where the molding hole portions 43D are connected to the second filling openings 32, and the discharge position due to the forward motion of the mold unit 25 slidingly moving in a left direction in the drawing, the molding hole portions 43U sequentially move to the discharge position, the second filling position where the molding hole portions 43U are connected to the second filling openings 32 in the upstream-side filling part 53U, and the first filling position where the molding hole portions 43U are connected to the first filling openings 31. Conversely, through the backward motion, the slide movement in a right direction in the drawing, of the mold unit 25, when the molding hole portions 43U sequentially move to the first filling position where the molding hole portions 43U are connected to the first filling openings 31 in the upstream-side filling part 53U, the second filling position where the molding hole portions 43U are connected to the second openings 32, and the discharge position, the molding hole portions 43D sequentially move to the discharge position, the second filling position where the molding hole portions 43D are connected to the second filling openings 32 of the downstream-side filling part 53D, and the first filling position where the molding hole portions 43D are connected to the first filling openings 31. The pushers 17 move from the retracted position to the lowered position every time the respective molding hole portions 43D, 43U move to the discharge position.

Supply stop parts are respectively provided to the respective second filling openings 32 in the downstream-side filling part 53D and the upstream-side filling part 53U. The supply stop part corresponding to the second filling opening 32 in the downstream-side filling part 53D is opened to supply the foodstuff F2 from the second filling openings 32 to the molding hole portion 43D at the time of forward motion of the mold unit 25, that is, when the molding hole portion 43D moves from the first filling position to the discharge position through the second filling position. The supply stop part corresponding to the second filling opening 32 in the downstream-side filling part 53D is closed when the mold unit 25 moves backward, stopping supply of the foodstuff F2 from the second filling opening 32 to the molding hole portion 43D returning from the discharge position to the first filling position.

On the other hand, the supply stop part corresponding to the second filling opening 32 in the upstream-side filling part 53U is opened to supply the foodstuff F2 from the second openings 32 to the molding hole portion 43U at the time of backward motion of the mold unit 25, that is, when the molding hole portion 43U moves from the first filling position to the discharge position through the second filling position. The supply stop part corresponding to the second filling opening 32 in the upstream-side filling part 53U is closed when the mold unit 25 moves forward, stopping supply of the foodstuff F2 from the second filing opening 32 to the molding hole portion 43D returning from the discharge position to the first filling position.

According to the above structure, the molded products F are taken out every time the molding hole portion 43D moves to the discharge position by the forward motion of the mold unit 25, and the molded products F are taken out every time the molding hole portion 43U moves to the discharge position by the backward motion.

Although the common discharge position is set, that is, the common pusher 17, the pusher port 33, and discharge hole 46 are used with respect to the molding hole portion 43D and the molding hole portion 43U in the above example, a first discharge position for the molding hole portion 43D and a second discharge position for the molding hole portion 43U can be separately provided. In this case, the first discharge position and the second discharge position are set so as to be shifted from each other in the slide direction of the mold unit 25. The molding hole portion 43U moves to the second discharge position when the molding hole portion 43D moves to the corresponding first filling position, and the molded product F is pushed out from the molding hole portion 43U by the pusher 17 arranged at the second discharge position. Conversely, the molding hole portion 43D moves to the first discharge position when the molding hole portion 43U moves to the corresponding first filling position, and the molded product F is pushed out from the molding hole portion 43D by the pusher 17 arranged at the first discharge position.

Figure 10:
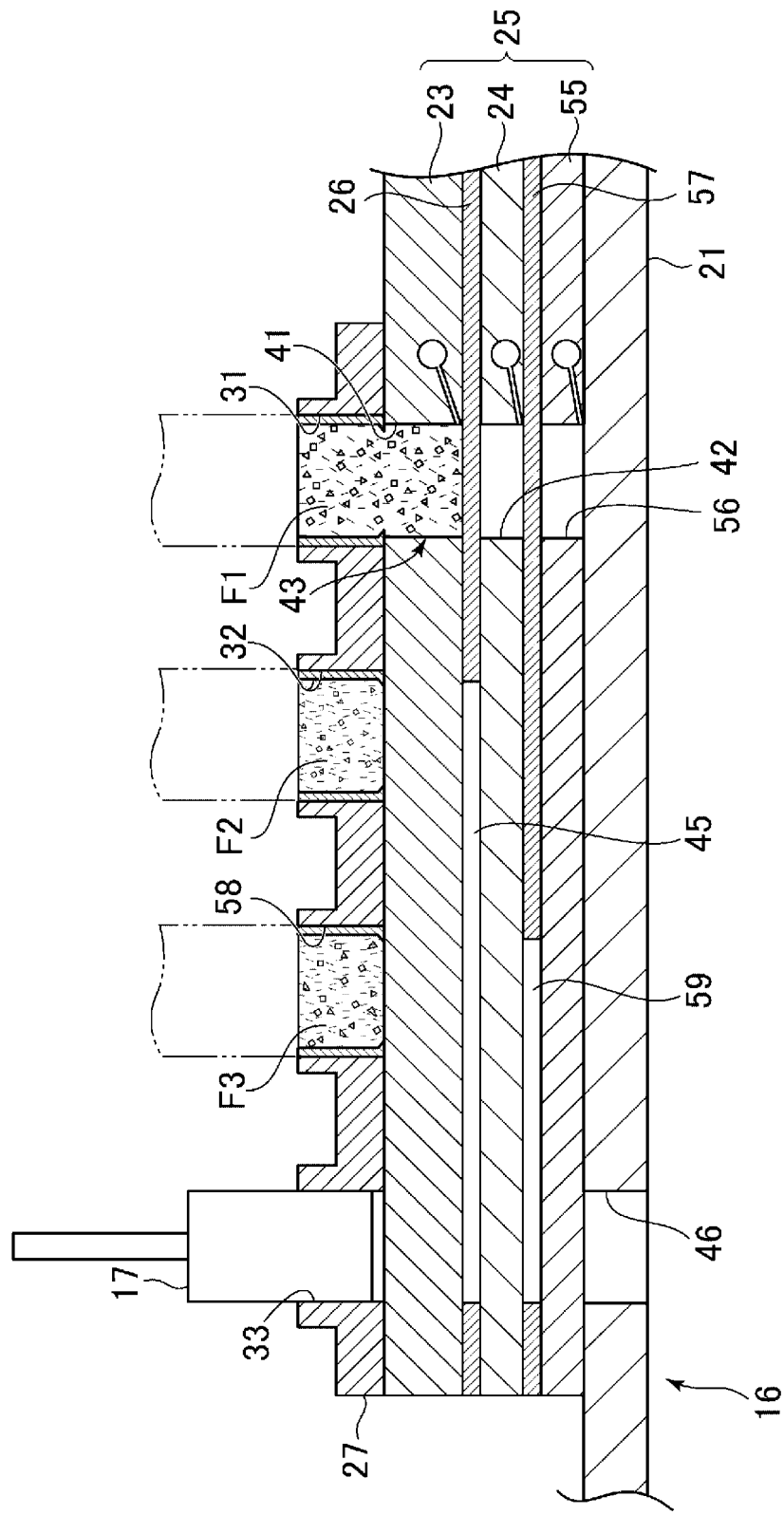
FIG. 10 is a cross-sectional view showing an example in which the mold unit is formed by first to third mold plates.

FIG. 10 shows the main body part 16 at the time of manufacturing a molded product in which foodstuffs F1 to F3 are stacked. The mold unit 25 of the main body part 16 in this example includes the first mold plate 23, the second mold plate 24, and a third mold plate 55, which are stacked in this order from above. Through holes 56 are formed in the third mold plate 55, forming the molding hole portions 43 together with the through holes 41 in the first mold plate 23 and the through holes 42 in the second mold plate 24.

The blocking plate 26 corresponding to the first mold plate 23 is arranged on a bottom surface thereof as the first blocking plate, a blocking plate 57 corresponding to the second mold plate 24 is arranged on a bottom surface thereof as the second blocking plate, and the base plate 21 corresponding to the third mold plate 55 functioning as the third blocking plate is arranged on a bottom surface of the third mold plate 55, respectively. In the cover plate 27, third filling openings 58 for filling the foodstuff F3 into the molding hole portions 43 are provided between the second filling openings 32 and the pusher ports 33.

The mold unit 25 is slidingly moved to the first to third mold positions and the discharge position. The molding hole portions 43 move to the first filling position, the second filling position, a third filling position in which upper ends are connected to the third filling openings 58, and the discharge position in this order by the movement of the mold unit 25.

The blocking plate 26 blocks lower ends of the through holes 41 of the molding hole portions 43 at the first filling position and is provided with the openings 45 in a movement range of the molding hole portions 43 from the second filling position to the discharge position. The blocking plate 57 blocks lower ends of the through holes 42 of the molding hole portions 43 at the second filling position and is provided with openings 59 in a movement range of the molding hole portions 43 from the third filling position to the discharge position. The base plate 21 is provided with the discharge holes 46 and blocks lower ends of the through holes 56 in a movement range of the molding hole portions 43 reaching to the front of the discharge holes 46. It is not always necessary that the blocking plate 57 in this example blocks lower ends of the through holes 42 in a range from the first filling position to the front of the second filling position. Moreover, it is not always necessary that the base plate 21 blocks lower ends of the through holes 56 in a range from the first filling position to the front of the third filling position.

According to the above example, the foodstuffs F1, F2 are sequentially filled into the through holes 41, 42 of the molding hole portions 43 at the first filling position and the second filling position in the same manner as the above example. Since the lower ends of the through hole 42 are blocked by the blocking plate 57 at the second filling position, the foodstuff F1 does not enter the through holes 56 in the third mold plate 55. When, after that, the molding hole portions 43 are moved to the third filling position by movement of the mold unit 25 to the third mold position, the foodstuff F3 is filled into the molding hole portions 43. At this time, the foodstuffs F1, F2 are pushed by the foodstuff F3 and move toward the through holes 56, and the through holes 56 are filled with the foodstuff F1 in this example. Accordingly, molded products F in which the foodstuffs F1 to F3 are sequentially stacked are formed inside the molding hole portions 43. After the molding hole portions 43 are moved to the discharge position, the molded products are pushed out from the molding hole portions 43 by the pushers 17.

In this example, when the first filling position is set as an upstream-side supply position, the second filling position and the third filling positions are downstream-side supply positions. When the second filling position is set as the upstream-side supply position, the third filling position is the downstream-side supply position. Furthermore, when the supply of the foodstuff F1 to the molding hole portions 43 at the first filling position is the first feeding process, the supply of the foodstuffs F2, F3 to the molding hole portions 43 at the second filling position and the third filling position is the second feeding process. When the supply of the foodstuff F2 to the molding hole portions 43 at the second filling position is the first feeding process, the supply of the foodstuff F3 to the molding hole portions 43 at the third filling position is the second feeding process.

In a case where N is an integer of 2 or more and the number of stacked layers of the foodstuffs is N, the mold unit is configured by first to N-th mold plates respectively provided with through holes, and linked through holes in respective mold plates are molding hole portions. Moreover, first to N-th filling openings from which the foodstuffs are supplied are provided and sequentially moved from first to N-th filling positions by one-direction movement of the mold unit, thereby filling the foodstuff from a J-th filling opening corresponding to a J-th (J is an integer from 1 to N) filling position. According to the above manner, molded products F in which the foodstuffs are stacked in N-layers inside the molding hole portions are formed, and the molded products F are discharged by being pushed out from the molding hole portions by the pushers at the discharge position. Moreover, first to N-th blocking plates are provided so as to correspond to the first to N-th mold plates. The J-th blocking plate arranged on a bottom surface (surface on the downstream side in the filling direction) of the J-th mold plate blocks lower ends of through holes in the J-th mold plate when the molding hole portions are at the J-th filling position, preferably blocks lower ends of through holes in the J-th mold plate in a range from the J-th filling position to the front of the (J+1)-th filling position (discharge position in a case of J+1=N). The supply stop part may be provided with respect to respective filling openings other than the first filling openings. Each supply stop part allows the foodstuff to be supplied (filled) from the second to N-th filling openings with respect to the molding hole portions moving from the first filling position to the discharge position, and stops supplying (filling) the foodstuff from the second to N-th filling openings with respect to the molding hole portions returning from the discharge position to the first filling position.

In the case where the molded products are taken out respectively at forward and backward motions of the mold unit as in the example shown in FIG. 9, when one molding hole portion of a pair of molding hole portions corresponding to the first molding hole portion and the second molding hole portion is at the first filling position corresponding to the molding hole portion, the other molding hole portion is at the discharge position. In a case where one molding hole portion is at the K-th filling position corresponding to the molding hole portion, the other molding hole portion moves to the (N−K+2)-th filling position corresponding to the molding hole portion when K is an integer of 2 or more to N or less. Each supply stop part allows the foodstuff to be supplied (filled) from the second to N-th filling openings with respect to one molding hole portion moving from the first filling position to the discharge position, and stops supplying (filling) the foodstuff from the second to N-th filling openings with respect to the other molding hole portion returning from the discharge position to the first filling position.

Second Embodiment

In a second embodiment, a rotary-type mold unit is used. Structures other than structures to be explained in detail below are the same as those of the first embodiment, and the same reference signs are given to substantially the same components and detailed explanation thereof is omitted.

Figure 11:
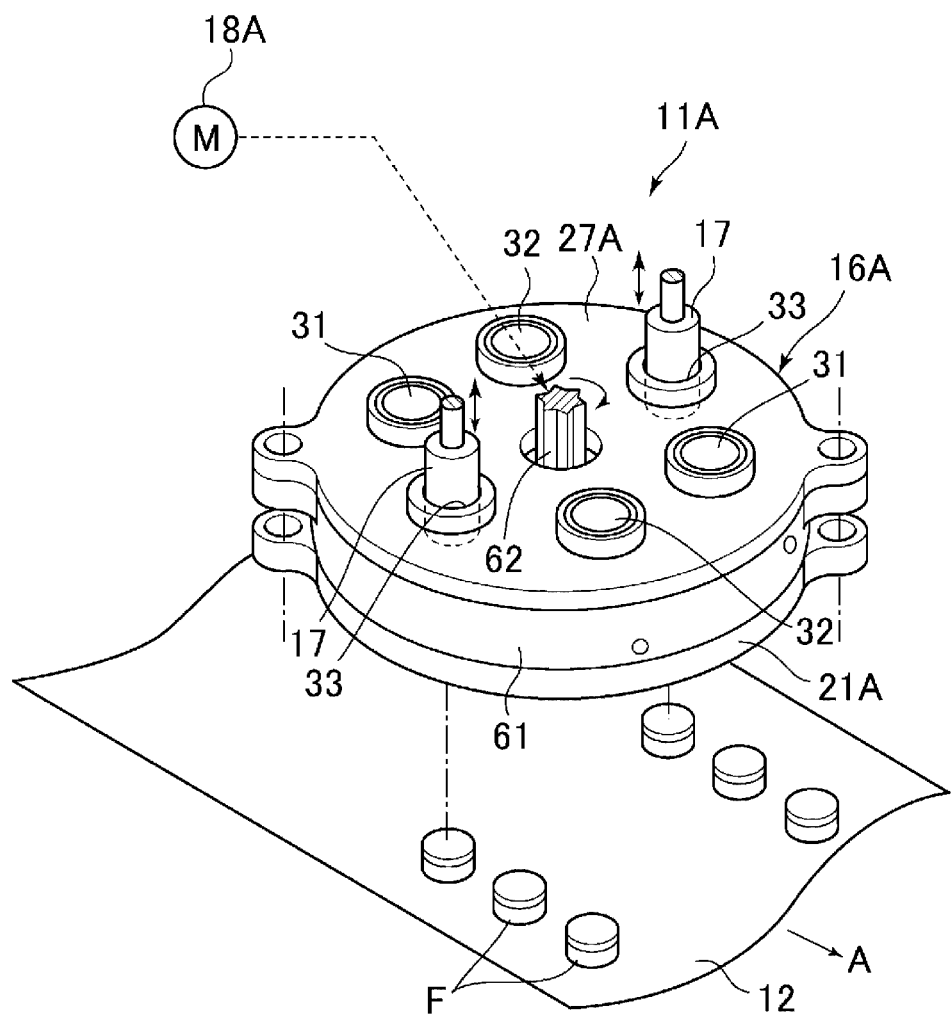
FIG. 11 is a perspective view showing a rotary-type food product molding device according to a second embodiment.

As shown in FIG. 11, a main body part 16A of a molding device 11A according to the second embodiment is arranged above the conveying belt 12. The main body part 16A has a structure in which a mold unit 25A (see FIG. 12) is arranged so as to rotate freely in a space surrounded by a base plate 21A, a ring member 61, and a cover plate 27A. Two pairs of the first filling openings 31, the second filling openings 32, and the pusher ports 33 are respectively provided on an upper part (the cover plate 27A) of the main body part 16A. The pushers 17 are provided so as to correspond to the respective pusher ports 33. The molded products F are discharged toward the conveying belt 12 through the discharge holes 46 (see FIG. 12) provided at portions in the base plate 21A just below the respective pusher ports 33. A rotation shaft 62 engaged with the mold unit 25A is connected to a motor 18A as a drive unit, and the mold unit 25A is rotated in one direction by the motor 18A. It is not always necessary that the first filling openings 31, the second filling openings 32, and the pusher ports 33 are integrally formed in the cover plate 27A but these may be separately provided, and the cover plate 27A can be omitted in the same matter as the first embodiment. The ring member 61 can be also omitted.

Figure 12:
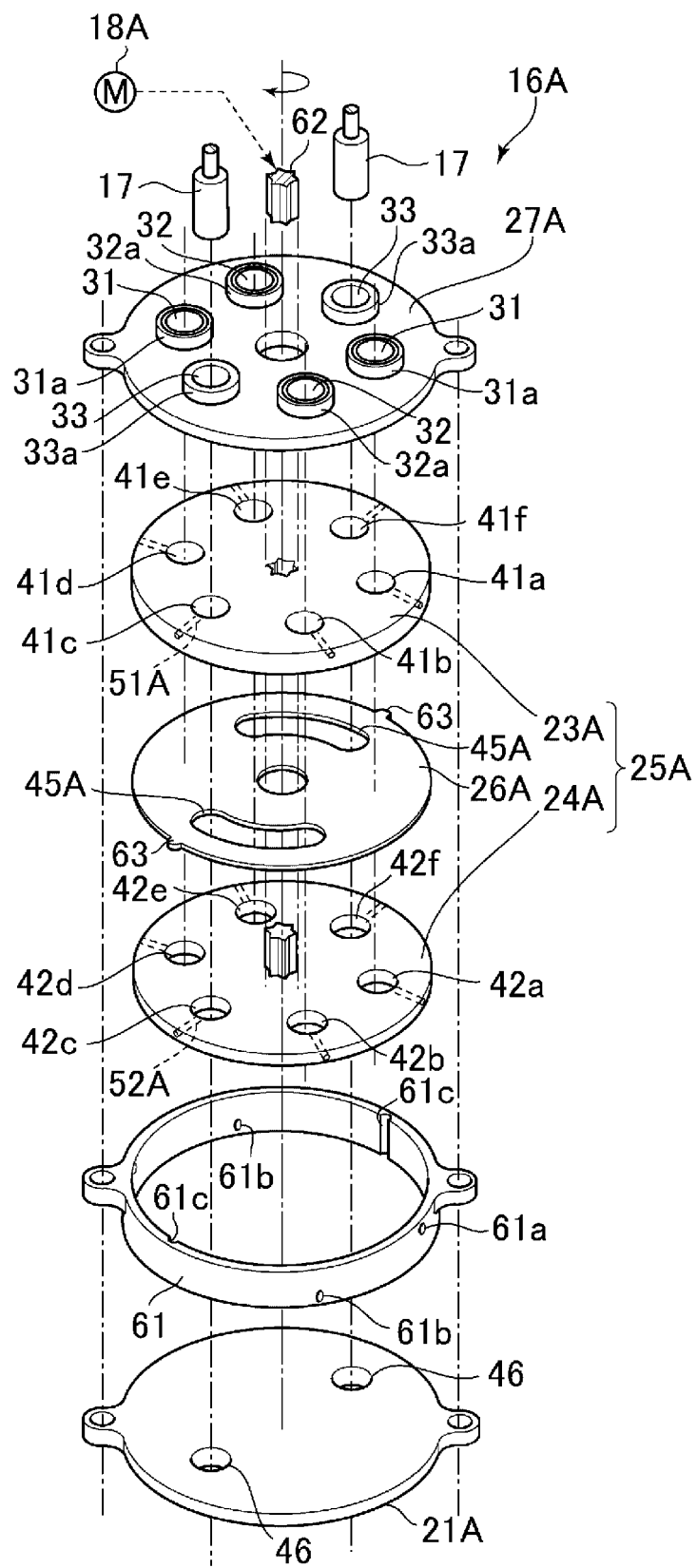
FIG. 12 is an exploded perspective view showing a structure of the food product molding device according to the second embodiment.

The foodstuff F1 (see FIG. 13) is supplied to the respective first filling openings 31 through the pipes 36 (see FIG. 13), and the foodstuff F2 (see FIG. 13) is supplied to the respective second filling openings 32 through the pipes 39 (see FIG. 12). It is not necessary to reversely rotate the mold unit 25A for returning the molding device 11A from the discharge position to the first filling position; therefore, the supply stop part is not provided.

As shown in FIG. 12, the main body part 16A includes a first mold plate 23A, a second mold plate 24A, and a blocking plate 26A respectively having a disk shape in addition to the base plate 21A, the ring member 61, and the cover plate 27A. The base plate 21A, the ring member 61, and the cover plate 27A are fixed so as not to rotate with the mold unit 25A. The first mold plate 23A and the second mold plate 24A are disposed above the base plate 21A so as to turn freely around the rotation shaft 62 as a rotation center. The first mold plate 23A and the second mold plate 24A are respectively engaged with the rotation shaft 62, rotating together. The mold unit 25A is configured by the first mold plate 23A and the second mold plate 24A.

The ring member 61 is arranged on an outer periphery of the mold unit 25A. The ring member 61 is preferably arranged so as to surround the mold unit 25A, and there may be a clearance between the ring member 61 and the mold unit 25A. The cover plate 27A is arranged above the mold unit 25A, and a clearance between the cover plate 27A and the base plate 21A is kept to be uniform by the ring member 61. The ring member 61 is replaceable, and a ring member having a height corresponding to a thickness of the mold unit 25A is used. The rotation shaft 62 protrudes upward of the main body part 16 from a hole at the center of the cover plate 27A. The hole of the cover plate 27A through which the rotation shaft 62 passes is closed in a state of allowing the rotation of the rotation shaft 62. As described above, the main body part 16A disposes the mold unit 25A in the space surrounded by the base plate 21A, the cover plate 27A, the ring member 61, and so on; therefore, it is possible to inhibit the foodstuff from leaking out from the inside to the outside of the main body part 16A.

In the first mold plate 23A, a plurality of, six through holes 41a to 41f in this example are provided on a circumference (on the same circumference) about the rotation shaft 62 at equal intervals (intervals of 60 degrees in this example). In the second mold plate 24A, the same number of through holes 42a to 42f as those of the first mold plate 23A are provided on a circumference about the rotation shaft 62 at equal intervals (intervals of 60 degrees in this example). When the through holes 41a to 41f are not differentiated, these are collectively called through holes 41. When the through holes 42a to 42f are not differentiated, these are collectively called through holes 42.

A diameter of the circumference in which the through holes 41a to 41f are provided and a diameter of the circumference in which the through holes 42a to 42f are provided are the same. The first mold plate 23A and the second mold plate 24A are stacked and integrated with the blocking plate 26A sandwiched therebetween so that axial centers of respective corresponding through holes 41 and corresponding through holes 42 are aligned with each other, for example, so that axial centers of the through hole 41a and the through hole 42a are aligned with each other. Accordingly, six molding hole portions 43 are formed.

In the cover plate 27A, two sets in which the first filling opening 31, the second filling opening 32, and the pusher port 33 are aligned in this order in one direction, namely, in a clockwise direction in this example are provided on the circumference about the rotation shaft 62. A diameter of the circumference in which the first filling openings 31, the second filling openings 32, and the pusher ports 33 are provided is the same as the diameters of the circumferences in which the through holes 41, 42 are provided. Accordingly, when the mold unit 25A makes a turning movement in the clockwise direction by 60 degrees, the six molding hole portions 43 respectively move to the first filling position, the second filling position, and the discharge position.

In the first mold plate 23A, air vent holes 51A connected to the through holes 41 are provided inside the plate with respect to respective through holes 41. In the second mold plate 24A, air vent holes 52A connected to the through holes 42 are provided inside the plate with respect to respective through holes 42. When the molding hole portion 43 including the through hole 41 to which the air vent hole 51A is connected is at the first filling position, an opening on a circumferential surface of the first mold plate 23A as one end of the air vent hole 51A is connected to a hole 61a provided in the ring member 61, and the air vent hole 51A is connected to an aspirator (not shown) through the hole 61a. On the other hand, when the molding hole portion 43 including the through hole 42 to which the air vent hole 52A is connected is at the second filling position, an opening on a circumferential surface of the second mold plate 24A as one end of the air vent hole 52A is connected to a hole 61b provided in the ring member 61, and the air vent hole 52A is connected to the aspirator (not shown) through the hole 61b. Accordingly, air inside the through hole 41 is vented at the timing when the foodstuff F1 is filled, and air inside the through hole 42 is vented at the timing when the foodstuff F2 is filled.

The blocking plate 26A is arranged on a bottom surface (surface on a downstream side in the filling direction) of the first mold plate 23A as a first blocking plate corresponding to the first mold plate 23A. The blocking plate 26A is fixed so as not to rotate with the rotation of the mold unit 25A. In this example, the blocking plate 26A is fixed with respect to the rotation direction by engaging projections 63 formed on a circumferential edge of the blocking plate 26A with recesses 61c formed on an inner circumferential surface of the ring member 61. Lower ends of the through holes 41 forming the respective molding hole portions 43 at the first position are blocked by the blocking plate 26A. The structure for fixing the blocking plate 26A is not limited to the above. For example, the blocking plate 26A may be fixed to the base plate 21A.

The blocking plate 26A is also provided with openings 45A in a movement range of the molding hole portions 43 from the second filling position to the following discharge position. The point in which the leakage of the foodstuffs F1, F2 through the clearance between the mold plates to the outside of the mold unit 25A is prevented, and the foodstuffs F1, F2 entering the clearance between the mold plates at the second position can be pushed back into the molding hole portions 43 by the blocking plate 26 is the same as the first embodiment.

The discharge holes 46 are respectively formed at portions in the base plate 21A just below the respective pusher ports 33. The discharge holes 46 are connected to the molding hole portions 43 set at the discharge position. The base plate 21A also functions as a second blocking plate corresponding to the second mold plate 24A.

The blocking plate 26A as the first blocking plate may block lower ends of the respective through holes 41 of the molding hole portions 43 at the first filling position in the same manner as the first embodiment, and preferably blocks lower ends of the respective through holes 41 in a range from the first filling position to the front of the second filling position as in the example. The same applies to the base plate 21A as the second blocking plate, which may respectively block lower ends of through holes 42 of the molding hole portions 43 at the second filling position, and preferably blocks lower ends of the through holes 42 in a range from the second filling position to the front of the discharge position.

In this example, the mold unit 25A is intermittently rotated in the clockwise direction. At this time, the mold unit 25A turns 60 degrees by a turning movement of one time. Accordingly, the timing of movements in the respective molding hole portions 43 is shifted in order of alignment in the rotation direction. When paying attention to one molding hole portion 43, the molding hole portion 43 sequentially moves to the first filling position, the second filling position, and the discharge position belonging to the first set, then, moves to the first filling position, the second filling position, and the discharge position belonging to the second set and returns to the first filling position of the first set during one rotation of the mold unit 25A.

Figure 13:
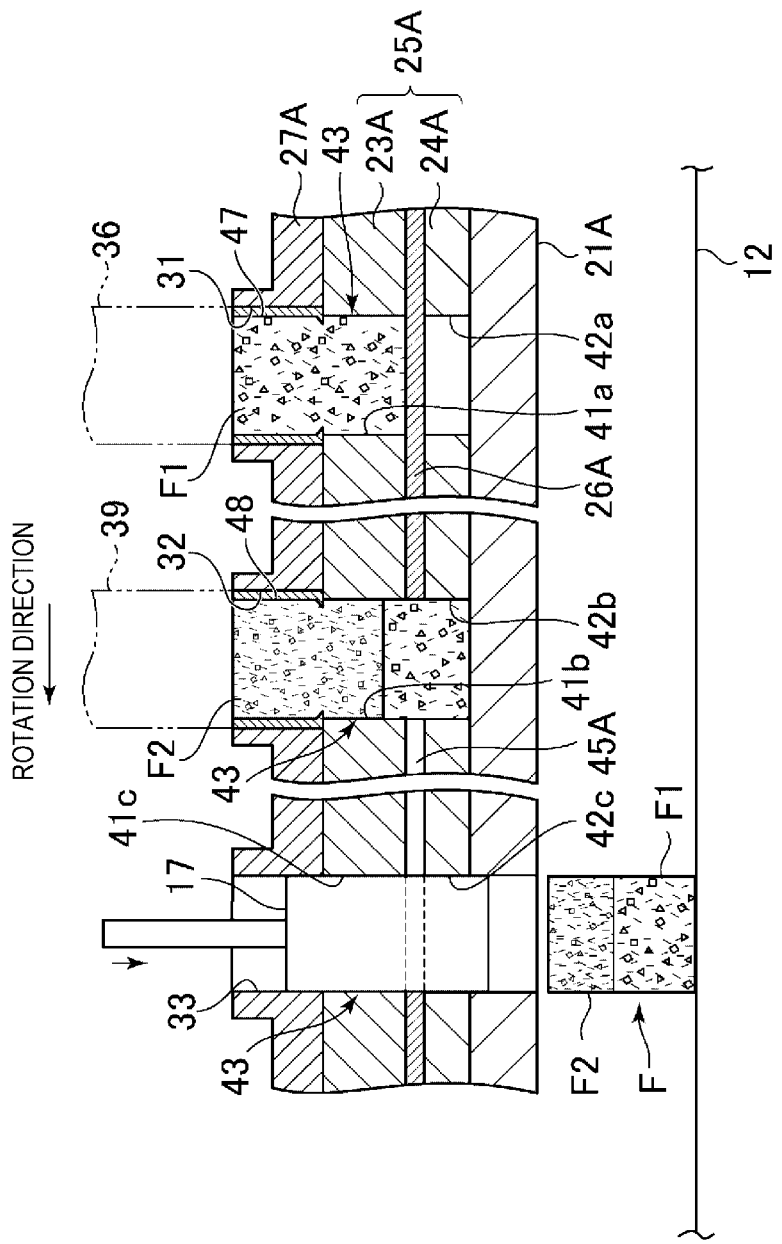
FIG. 13 is a cross-sectional view showing states of respective molding hole portions according to the second embodiment.

Due to the turning movement of the mold unit 25A, the molding hole portions 43 are set to the first filling position, the second filling position, and the discharge position belonging to each set respectively by each turning movement as shown in FIG. 13. Then, filling of the foodstuff F1 from the first filling openings 31 to the molding hole portions 43 at the first filling position, filling of the foodstuff F2 from the second filling openings 32 to the molding hole portions 43 at the second filling position, and pushing by the pushers 17 to the molded products F inside the molding hole portions 43 at the discharge position are performed at the same time as shown in FIG. 13. As a result, two pieces of molded products F are discharged on the conveying belt 12 by each turning movement of the mold unit 25A. The details concerning the blocking state of the molding hole portions 43 at the first filling position, the second filling position, and the discharge position, filling of the foodstuffs F1, F2, movement of the foodstuffs F1, F2 by the turning movement of the mold unit 25A, and so on are the same as those of the first embodiment.

In the rotary-type molding device 11A, it is not necessary to rotationally move the mold unit 25A in a reverse direction to be returned to the original first filling opening 31 after the molding hole portion 43 moves to the discharge position. Therefore, it is advantageous for increasing manufacturing efficiency of the molded products F. It is also not necessary to provide the supply stop part for preventing the foodstuff F2 from flowing into the molding hole portion 43 at the time of returning the molding hole portion 43 to the first filling opening 31 in the rotary-type molding device 11A; therefore, the structure is further simplified.

Figure 14:
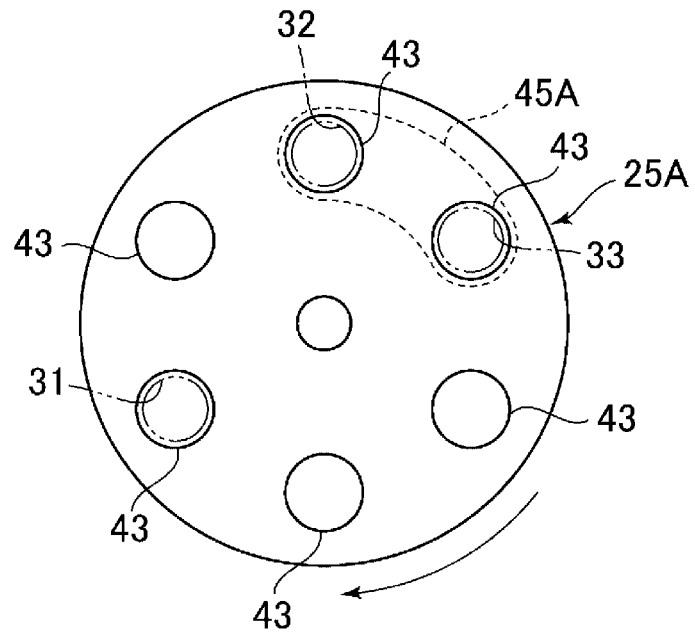
FIG. 14 is an explanatory view showing an example in which one set of a filling opening and a pusher port is provided.

Two sets of the first filling openings, the second filling openings, and the pusher ports are provided in the above example; however, one set or three of more sets may be provided. Moreover, the total number of the first filling openings, the second filling openings, and the pusher ports corresponds to the number of molding hole portions in the above example; however, the number of molding hole portions may be larger than the total number of the first filling openings, the second filling openings, and the pusher ports. In an example of a rotary-type molding device shown in FIG. 14, one set of the first filling opening 31, the second filling opening 32, and the pusher port 33 is provided with respect to six molding hole portions 43 provided in the mold unit 25A formed by two mold plates. In this example, the molding hole portion 43 positioned at the first filling opening 31 moves to the second filling position when the mold unit 25A makes the turning movement twice (60 degrees× twice), and moves to the discharge position from the second filling position by one turning movement of the mold unit 25A. The molding hole portion 43 moves to the original first filling position from the discharge position when the mold unit 25A makes the turning movement three times. The blocking plate blocks lower ends of the through holes on the first filling hole 31 side forming the molding hole portion 43 at the first filling position, and the opening 45A is provided in each movement range from the second filling position to the discharge position. In a case where fillings and pushing at the first filling position, the second filling position, and the discharge position are not simultaneously performed, the number of molding hole portions can be smaller than the total number of the first filling openings, the second filling openings, and the pusher ports.

The mold unit is formed by the first mold plate and the second mold plate in the above second embodiment; however, three or more mold plates may be used in the same manner as in the first embodiment. Moreover, a plurality of molding devices may be arranged to manufacture molded products. In this case, it is preferable that at least N+1 through holes are formed and at least N+1 molding hole portions are formed in each mold plate when the first to N-th filling openings are provided and the mold unit is formed by the first to N-th mold plates. According to the structure, N pieces of molding hole portions can be moved to the first to N-th filling positions at the same time as when one molding hole portion moves to the discharge position, which is efficient. Moreover, when the number of molding hole portions is an integer multiple of N+1, a plurality of molded products can be efficiently obtained by each turning movement of the mold unit.

Figure 15:
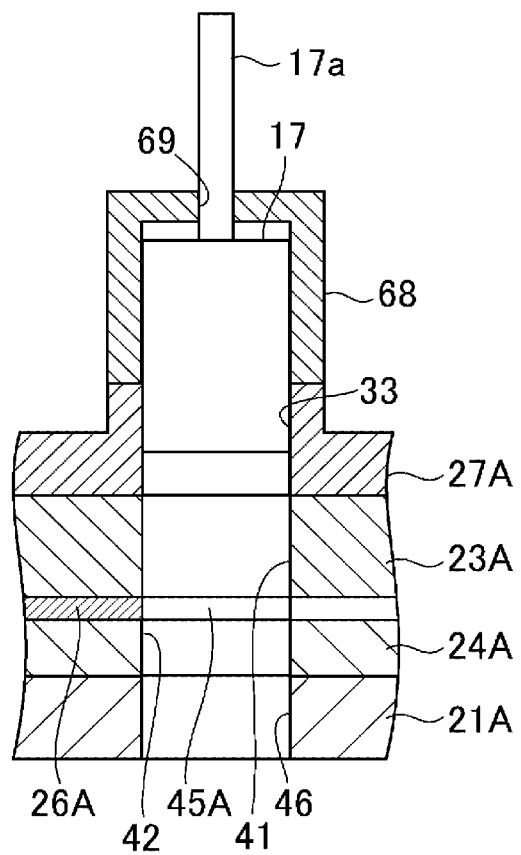
FIG. 15 is a cross-sectional view showing an example in which a lid member is attached to an upper part of the pusher port.

FIG. 15 shows an example in which an upper end part of the pusher port 33 is closed by a lid member 68. The lid member 68 is provided with a hole 69 through which the shaft 17a passes. According to the structure, leakage of the foodstuffs F1, F2 from the pusher port 33 to the outside can be suppressed. The lid member may be provided at upper end parts of the pusher ports also in the sliding-type molding device as the first embodiment in the same manner.

In the above first and second embodiments, respective foodstuffs are supplied to the molding device from above and the molded products are discharged below. In both molding devices, falling or the like of respective foodstuffs filled inside the molding hole portions does not occur in any posture, and the relation between the pushing direction of molded products by the pushers and the filling direction of foodstuffs is not restricted by the structure. Therefore, the posture of the molding device, the filling direction of respective foodstuffs to the molding device, and the pushing direction of the molded products can be set optionally and independently. For example, it is possible to adopt a layout in which respective foodstuffs are filled from below and molded products are discharged from below, while the molding device is arranged so that the mold unit makes a slide movement or a turning movement within a horizontal surface in the same manner as the first and second embodiments. In the case of this layout, it is preferable that respective filling openings are provided in the base plate and only the pusher ports are provided in the cover plate. It is also possible to adopt a layout in which respective foodstuffs are filled with respect to the molding device in the horizontal direction and molded products are taken out in the horizontal direction while the molding device is arranged so that the mold unit rotates with a horizontal direction being set as an axis.

The foodstuffs are respectively filled in the molding hole portions in respective filling positions in the first and second embodiments; however, foodstuffs may be filled at two or more filling positions when there are three or more filling positions. In that case, for example, when foodstuffs are respectively filled into the molding hole portions at the first filling position and the third filling position, the first filling position corresponds to the upstream-side supply position and the third filling position corresponds to the downstream-side supply position.

Though the example in which foodstuffs are filled into the molding hole portions or the through holes has been explained, it is not necessary that the molding hole portions and the through holes are filled with foodstuffs completely, but it is sufficient that foodstuffs are filled into the molding hole portions or the through holes sequentially and that food products are molded in a state where foodstuffs are stacked in layers.

Moreover, the blocking plate for blocking the through holes is used as the restraining member in the above respective examples; however, it is sufficient that the restraining member can restrain substantial movement of foodstuffs to the downstream side in the supply direction from downstream ends in the supply direction of the through holes covered by the restraining member. Therefore, the restraining member is not necessary to completely block the downstream ends in the supply direction of the through holes. For example, it does not matter that part of the foodstuff leaks out a little on the downstream side in the supply direction from a gap generated between the restraining member and the through hole. Ina case, for example, where the foodstuff entering the through holes is a relatively large solid body or the like, downstream ends in the supply direction of the through holes may be covered with the restraining member in a state where part of the downstream end is opened, or, for example, a mesh-shaped restraining member may be used. In the case where part of the downstream side of the through hole is opened or the mesh-shaped restraining member is used as described above, air is vented from the opened part or meshes; therefore, the air vent hole can be omitted. Furthermore, liquid such as excessive water contained in foodstuffs to be supplied or supplied with foodstuffs can be discharged from the opened part of the through hole or meshes. It is preferable that a thickness of the restraining member arranged between the stacked mold plates is thin.

REFERENCE SIGNS LIST

10: food product molding apparatus
11, 11A: molding device
16, 16A: main body part
17: pusher
21, 21A: base plate
23, 23A: first mold plate
24, 24A: second mold plate
25, 25A: mold unit
26, 26A, 57: blocking plate
31: first filling opening
32: second filling opening
33: pusher port
33a: sleeve
41,41a to 41f, 42, 42a to 42f, 56: through hole
43, 43D, 43U: molding hole portion
46: discharge hole
58: third filling opening
F: molded product
F1, F2, F3: foodstuff

The invention claimed is:

1. A food product molding device comprising:
a mold unit in which first to N-th mold plates moving together are stacked in order when N is an integer of two or more;
a molding hole portion formed by respective through holes respectively formed in the first to N-th mold plates being linked in a stacking direction of the first to N-th mold plates, sequentially moving from first to N-th supply positions corresponding to first to N-th supply openings for supplying foodstuffs by the movement of the mold unit in one direction, and moving to a discharge position;
first to N-th restraining members provided so as to correspond to the first to N-th mold plates; and
a pusher pushing out the foodstuffs inside the molding hole portion at the discharge position,
wherein, when J is an integer from 1 to N, a J-th restraining member covers a downstream end in a supply direction of the through hole in a J-th mold plate so as to restrain movement of the foodstuff from the through hole in the J-th mold plate to a downstream side in the supply direction when the molding hole portion is at a J-th supply position, and does not cover the downstream end in the supply direction of the through hole in the J-th mold plate when the molding hole portion is at a (J+1)-th supply position to the discharge position.

2. The food product molding device according to claim 1, wherein the mold unit is configured to move in a reverse direction to return the molding hole portion to the first supply position after the molding hole portion moves to the discharge position, further comprising:

a supply stop part for stopping supply of the foodstuff from the second to N-th supply openings to the molding hole portion returning to the first supply position from the discharge position.

3. The food product molding device according to claim 2, wherein a pair of the through holes aligned in a movement direction of the mold unit are formed in the respective first to N-th mold plates to thereby form a first molding hole portion and a second molding hole portion, the first molding hole portion and the second molding hole portion move to the first to N-th supply positions where the molding hole portions are connected to the first to N-th supply openings provided so as to correspond to the first molding hole portion and the second molding hole portion, respectively, and when one molding hole portion is at the first supply position, the other molding hole portion is at the discharge position, and when one molding hole portion is at a K-th supply position, the other molding hole portion moves to a (N−K+2) supply position in a case where K is an integer of two or more to N or less.

4. The food product molding device according to claim 1, wherein the mold unit is capable of rotating freely around the stacking direction of the first to N-th mold plates as a rotation axis.

5. The food product molding device according to claim 4, wherein at least N+1 through holes are formed in the first to N-th mold plates respectively to thereby format least N+1 molding hole portions, and N pieces of molding hole portions move to the first to N-th supply positions at the same time as when one molding hole portion moves to the discharge position.

6. The food product molding device according to claim 5, wherein the number of molding hole portions is the number of an integer multiple of N+1.

* * * * *